US010212570B1

(12) United States Patent
Ramalingam

(10) Patent No.: US 10,212,570 B1
(45) Date of Patent: Feb. 19, 2019

(54) SYSTEM FOR PROVIDING NOTIFICATIONS TO USER DEVICES

(71) Applicant: AMAZON TECHNOLOGIES, INC., Seattle, WA (US)

(72) Inventor: Harsha Ramalingam, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 226 days.

(21) Appl. No.: 14/673,783

(22) Filed: Mar. 30, 2015

(51) Int. Cl.
| H04W 4/90 | (2018.01) |
| H04L 12/58 | (2006.01) |
| H04W 4/021 | (2018.01) |
| H04W 4/02 | (2018.01) |
| H04W 72/00 | (2009.01) |
| H04W 4/12 | (2009.01) |
| H04W 4/70 | (2018.01) |

(52) U.S. Cl.
CPC ............ *H04W 4/90* (2018.02); *H04L 51/046* (2013.01); *H04W 4/021* (2013.01); *H04W 4/025* (2013.01); *H04W 4/12* (2013.01); *H04W 4/70* (2018.02); *H04W 72/005* (2013.01)

(58) Field of Classification Search
CPC .......... H04W 4/22; H04W 4/02; H04W 4/06; H04M 1/72552; H04M 2250/12; G08B 25/016
See application file for complete search history.

(56) References Cited

U.S. PATENT DOCUMENTS

| 8,521,128 | B1* | 8/2013 | Welsh | H04W 4/21 |
| | | | | 455/404.2 |
| 9,247,408 | B2* | 1/2016 | South | H04W 4/22 |
| 2009/0247116 | A1* | 10/2009 | Sennett | H04M 11/04 |
| | | | | 455/404.2 |
| 2012/0064819 | A1* | 3/2012 | Heen | H04W 4/90 |
| | | | | 455/3.01 |
| 2012/0092161 | A1* | 4/2012 | West | G08B 25/005 |
| | | | | 340/540 |
| 2012/0200411 | A1* | 8/2012 | Best | G08G 1/096775 |
| | | | | 340/539.13 |
| 2012/0282887 | A1* | 11/2012 | Khoo | G08G 1/205 |
| | | | | 455/404.2 |
| 2014/0139335 | A1* | 5/2014 | Vallaire | G08B 27/008 |
| | | | | 340/539.13 |
| 2015/0147995 | A1* | 5/2015 | Bontu | H04W 4/22 |
| | | | | 455/404.1 |
| 2015/0230072 | A1* | 8/2015 | Saigh | H04W 4/22 |
| | | | | 455/404.1 |
| 2016/0065737 | A1* | 3/2016 | Williams | H04M 1/72538 |
| | | | | 455/404.1 |
| 2018/0012471 | A1* | 1/2018 | Bauer | G08B 21/0277 |

* cited by examiner

*Primary Examiner* — Liton Miah
(74) *Attorney, Agent, or Firm* — Lindauer Law, PLLC

(57) ABSTRACT

Described are techniques for providing event messages to mobile devices and other types of user devices. User communications and sensor data from the user devices may be used to determine an emergency condition. User data associated with a user device may be used to determine the content contained in an event message generated for receipt by that user device. Communications from users, responsive to the event message, may be curated, provided to other users, or responded to.

20 Claims, 9 Drawing Sheets

SYSTEM FOR PROVIDING NOTIFICATIONS TO USER DEVICES

BACKGROUND

Mobile devices and other types of computing devices may be used to provide notifications, such as emergency alerts, to users of the devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
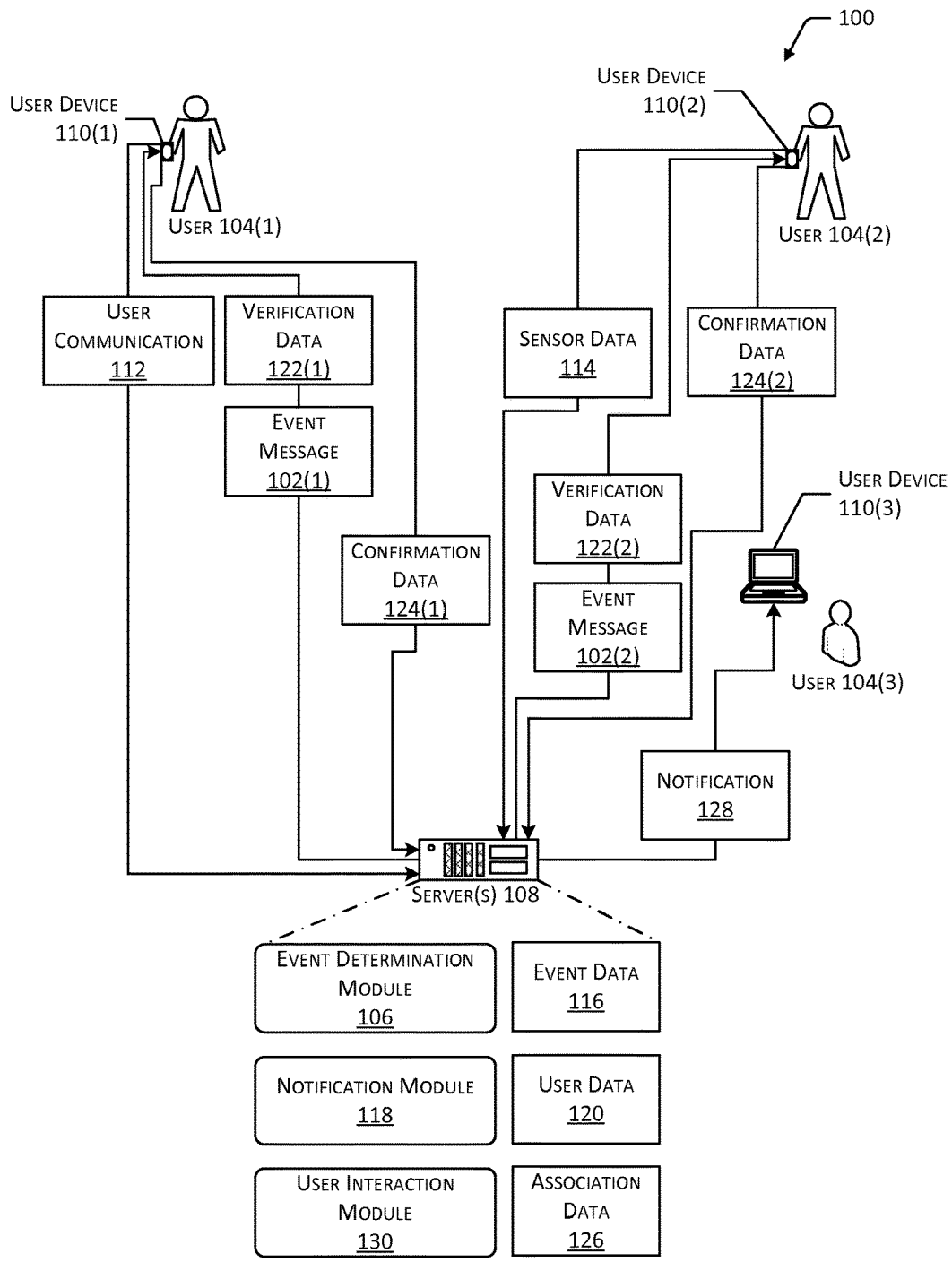
FIG. 1 depicts a system for determining emergency conditions and providing event messages to users.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Systems for broadcasting certain types of notifications to mobile devices and other types of user devices may be limited to certain providers, formats, and channels of communication. Such notifications may include messages regarding an emergency condition, items of interest to one or more users, an event (e.g., a musical or sporting event where multiple individuals may gather) that may impact services, communications, or transportation in an area, and so forth. For example, a typical emergency alert system may be limited to providing messages no greater than ninety characters in length, generated by a cellular carrier or a governmental agency, which may be distributed by cellular towers within a region of interest to all user devices within the region, for display on a lock screen or similar interface of the user devices. Conventional alert systems may be inadequate for individual circumstances associated with a user. For example, a user's current location, age (e.g., child or elderly), physical state (e.g., impaired mobility), and so forth, may cause a general emergency alert to be ineffective for use by a particular user. Conventional alert systems may also be affected by deficiencies in one or more networks, such as outages caused by an emergency condition.

Described in this disclosure are techniques for providing configurable notifications (e.g., emergency alerts) to user devices that may be customized based on the individual circumstances or preferences of a user or of the provider of a message. For example, a user may subscribe to receive messages from one or multiple providers. The messages may include any format or channel of communication, such as short message service (SMS), e-mail, communications via a cellular network, communications via a social networking site or service, communications via an emergency alert channel, communications using a stand-alone application interface, and so forth. To ensure the authenticity of a notification, a user and a provider of a message may establish verification data. For example, a user may select an alphanumeric string, such as a password, that may be provided by the message provider prior to a notification. Receipt of the preselected alphanumeric string may cause the user device to begin receiving or processing the message. Continuing the example, the first portion of a received message may include the selected alphanumeric string, which may be followed by an event message. Responsive to determination of the alphanumeric string by a receiving user device, the receiving user device may begin to process the remainder of the received message. In other implementations, a registration key, a digital certificate, or other cryptographically derived data or similar means of verification identifiable by the user device may be used as verification data. In still other implementations, the verification data may include an image, video, sound, and so forth, that may be recognized by a user or a user device to indicate the authenticity of a communication. The verification data may be used to authenticate one or more of a user, a user device or server, or a message. In some implementations, receipt of the verification data may cause modification of one or more configurations of the user device. For example, the current volume setting, vibration setting, or light setting of a mobile device may be overridden to alert the user of the notification. Event messages provided to users may be customized to minimize use of bandwidth and increase reliability and efficiency. For example, event messages may be limited in size or content, may use text in place of images, may update existing images sent previously rather than providing replacement images, and so forth. In some implementations, receipt of an event message configured to use a limited amount of bandwidth may cause a user device to execute stored content. For example, receipt of an event message indicative of a hurricane may cause a user device to begin playing a video describing evacuation routes and safety procedures relating to hurricanes. Continuing the example, when a user device reaches a location where certain types of emergency conditions may be common, such as a city along a fault line where earthquakes are prevalent, the user device may be provided with content relevant to those types of emergency conditions. In some implementations, a user may receive a notification upon receipt of content relating to an emergency condition, such as a prompt offering to present the content to the user. Execution of the content may be triggered manually by the user or automatically by the user device upon receipt of a subsequent event message indicative of the associated type of emergency condition.

In some implementations, messages may be customized based on the circumstances associated with a particular user. For example, the current location of a user device may be determined using a Global Positioning Satellite (GPS) receiver or similar location features of the user device. The message provided to that user device may include a suggested route from the current location of the user device to a safe location (e.g., a shelter location). As another example, sensor data received from a user device or other data associated with a user or an area may indicate that the user has impaired mobility, the user has become incapacitated due to an emergency condition, certain routes proximate to the user are impassable or unsafe due to an event, and so forth. The message provided to a user device may include content that accounts for the individual circumstances associated with a particular user of the user device. Continuing the example, a message provided to a user that uses a wheelchair may include a wheelchair-accessible route in place of a route sent to other users that do not user a wheelchair. In some implementations, the messages provided to users may include content that corresponds to circumstances related to other users. For example, messages sent to users within an area may include a route or instructions to assist a disabled or incapacitated user within the area. Users may receive a prompt by which they may indicate their willingness to provide assistance.

The circumstances associated with a particular user may also include association data indicative of the user's associations with other individuals, such as friends or family members. For example, association data may include contact information for other individuals, such as friends or family members, associated with the particular user, which may be accessed during an emergency condition. Continuing the example, when a message regarding an emergency condition is provided to a user device, that message or an indication that the message was sent may be provided to one or more other devices of associated individuals determined from that user's association data. In other implementations, notifications may be provided to the one or more other devices of associated individuals after a user in an area associated with an event confirms receipt of the message.

In some implementations, a system may be configured to receive communications from a user device. For example, responsive to a message regarding an emergency condition, a user may provide a return message indicating an impassable or unsafe route, a detour, a request for assistance, an indication of a disability or limited mobility, and so forth. The system response to a user message may vary depending on the content of the user message. For example, content received from a user regarding routes or detours may be provided to other user devices within the area to alert other users regarding safe or unsafe routes. Responsive to a request for assistance, an individual associated with the system, such as an administrator, an operator, or a message curator, may provide users with voice or text-based communications, a map interface, assistance regarding navigation using a chat interface, and so forth. In some implementations, multiple users within an area may be provided with an interface through which the users may communicate with one another regarding routes, assistance for users with impaired mobility, and so forth. An individual associated with the system may curate, moderate, or otherwise filter interactions between users. For example, an individual may determine content from user messages that may be useful to other users within an area and provide that content to other users.

In some implementations, a communication from a user device or sensor data determined from the user device may be used to determine an event. For example, image data, audio data, motion data, temperature data, biometric data, or other sensor data may be determined using sensors associated with one or multiple user devices within an area. If the sensor data deviates from one or more reference values by more than a threshold amount, an event may be determined. In other implementations, an event may be determined if sensor data exceeds a threshold value or fails to meet the threshold value. In some implementations, communications from user devices, or sensor data determined from user devices, may be verified, such as by providing a prompt to user devices within an area requesting confirmation of an event, determining sensor data from additional user devices within the area, and so forth.

Implementations described in this disclosure may increase the likelihood that a user will successfully receive a notification regarding an emergency or other event through use of receipt confirmation, two-way communication, modification of the configurations of a user device, and the notification of other individuals associated with a user. Implementations described in this disclosure may also increase the amount of relevant information provided to users in an area by using sensor data and communications received from user devices to determine information specific to particular users or information about an event, which may determine content provided to one or multiple user devices in an area.

FIG. 1 depicts a system 100 that may be used to determine events and provide event messages 102 regarding the events to one or more users 104. An event determination module 106 associated with one or more servers 108 or other types of computing devices may be used to determine the presence of an emergency or other event (e.g., a parade, concert, sporting event, and so forth) associated with an area. In some implementations, one or more sensors or computing devices associated with the area may provide data indicative of an event to the server(s) 108. In other implementations, a user 104 may provide an indication of the event to the server(s) 108 or may compose an event message 102. In still other implementations, the event determination module 106 may determine an event from user devices 110 associated with users 104 in the area. User devices 110 may include any type of computing device, such as a mobile device, a set-top box, a tablet computer, a personal computer, a wearable computer, and so forth.

As depicted in FIG. 1, a first user 104(1) having a first user device 110(1) is shown providing a user communication 112 to the server(s) 108. The first user device 110(1) may communicate with the server(s) 108 using one or more networks, such as local area networks (LANs), wireless LANs, wide area networks (WANs), wireless WANs, cellular networks, and so forth. For example, the first user device 110(1) may include devices compatible with Ethernet, Wi-Fi, Bluetooth, ZigBee, Z-Wave, 3G, 4G, LTE, and so forth. The user communication 112 may include an indication of an event associated with an area proximate to the first user device 110(1). For example, a user 104 may provide a message for transmission to the server(s) 108. In some implementations, the user 104 may actuate one or more sensors of the first user device 110(1), such as a camera, a microphone, an accelerometer or other motion sensor, and so forth, to provide data to the server(s) 108. The user communication 112 may be provided to the server(s) 108 using one or multiple channels of communication, such as SMS, e-mail, a communication via a cellular network, a communication via a social media site, a communication via an application interface, and so forth.

A second user 104(2) having a second user device 110(2) is shown providing sensor data 114 to the server(s) 108. The sensor data 114 may include data determined from one or more types of sensors associated with the second user device 110(2). For example, sensor data 114 may include image data obtained using cameras or other image sensors of the second user device 110(2). The image data may include images or videos depicting at least a portion of an area or of the second user 104(2), data regarding ambient light in an area (e.g., indicative of lightning or fire), and so forth. Sensor data 114 may include audio data obtained using microphones or other audio components of the second user device 110(2). Audio data may include sound produced by the second user 104(2), one or more other individuals within or proximate to an area, audible alarms within an area, an emergency condition (e.g., thunder, wind, fire, collapsing structures), and so forth. Sensor data 114 may further include motion data, which may be obtained using an accelerometer, gyroscope, or other types of motion detectors associated with the second user device 110(2). For example, motion data may include vibrations indicative of thunder, wind, or an earthquake, movement indicative that the second user 104(2) is running, movement or an orientation indicative that the second user 104(2) has fallen, and so forth. Sensor data 114 may also include temperature data. A thermometer or a similar temperature sensor associated with the second user device 110(2) may determine an ambient temperature indicative of a fire, a blizzard, extreme ambient temperatures, or another type of emergency condition. Sensor data 114 may include biometric data. For example, one or more biometric sensors associated with the second user 104(2) may be used to determine a cardiac event, cessation of breathing or irregular breathing, a loss of consciousness, a fever or irregular body temperature, a seizure, physiological indications of panic, and so forth. Sensor data 114 may also include location data, which may include data indicative of a location or position of the second user device 110(2). For example, a radio navigation-based system, such as a terrestrial or satellite-based navigational system, may be used to determine a current location of the second user device 110(2). Satellite-based navigational systems may include a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth.

Responsive to receipt or determination of one or more of the user communication 112, the sensor data 114, or other data associated with the user devices 110 or the area in which the user devices 110 are located, the event determination module 106 may determine the presence or absence of an event. For example, the event determination module 106 may access event data 116 associated with the server(s) 108. The event data 116 may include one or more threshold values associated with one or more types of sensor data 114, a threshold number of user communications 112, a threshold number of sensor data 114 values, and so forth. For example, based on variances between the sensor data 114 and one or more threshold values (e.g., reference values) of the event data 116, the event determination module 106 may determine the presence of an event that may impact an area, responsive to which a notification module 118 may generate event messages 102 to be provided to the user devices 110 within or proximate to the area. As another example, if a number of user communications 112 equal to or exceeding a threshold number of user communications 112 is received, the event determination module 106 may determine the presence of an event. In another example, if the number of sensor data 114 values that vary from a corresponding threshold value by more than a threshold amount equals or exceeds a threshold number of sensor data 114 values, an event may be determined. In some implementations, responsive to receipt of sensor data 114 or one or more user communications 112 from a user device 110, the event determination module 106 may provide a prompt to one or more users 104 within or proximate to the area requesting verification of the presence or absence of an event, such as an emergency condition. In other implementations, responsive to receipt of sensor data 114 or one or more user communications 112, the event determination module 106 may determine additional sensor data 114 from one or more other user devices 110 within or proximate to the area. A feedback loop may be used to modify one or more threshold values. For example, if an ambient condition at a location exceeds a threshold value, but user communications 112 or additional sensor data 114 indicates the absence of an event, one or more threshold values associated with the location may be modified to account for the ambient condition.

The notification module 118 may determine one or more user devices 110 within an area or within a threshold distance of the area where an event is determined. The threshold distance may be determined by the nature of the event. For example, an earthquake or hurricane may include a threshold distance of one mile or greater, a sporting event may include a threshold distance of one hundred yards, and a fire confined to a single building may include a threshold distance of ten feet. A user device 110 within the area associated with the event may be determined to be within the threshold distance (e.g., the threshold distance would be zero). Similarly, a user device 110 outside of the area but within the threshold distance from at least a portion of the area may be determined to be within the threshold distance. A user device 110 outside of the area, that is positioned a distance away from the area that is greater than the threshold distance, may not be within the threshold distance.

The notification module 118 may access user data 120 associated with one or more users 104 within the area for which an event is determined. The user data 120 may include data specific to a user 104, such as the user's 104 residential or employment address, historical location data associated with the user 104, characteristics of the user device 110 such as channels of communication able to be received by the user device 110, the user's 104 age, medical conditions associated with the user 104 such as impaired mobility or altered mental state, and so forth. The user data 120 may also include verification data 122 associated with the user 104. Verification data 122 may include a registration key or similar type of data that may be recognized and exchanged by the user devices 110 and the server(s) 108. In some implementations, the verification data 122 may include an alphanumeric string, such as a password, which may be selected by a user 104. Each user 104 may therefore have unique verification data 122 associated with that particular user 104. For example, the server(s) 108 may determine first verification data 122(1) from the user data 120 and provide the first verification data 122(1) to the first user device 110(1) prior to providing a first event message 102(1) to the first user device 110(1). Similarly, the server(s) 108 may provide second verification data 122(2) to the second user device 110(2) prior to providing a second event message 102(2) to the second user device 110(2). The verification data 122 may be used to ensure that a user 104 receives event messages 102 solely from message providers selected by the user 104. For example, event messages 102 sent by other providers would not be accompanied by verification data 122. A user device 110 may refrain from receiving or processing an event message 102, or otherwise disregard the event message 102, if the event message 102 is not accompanied by verification data 122.

In some implementations, the verification data 122 may be configured to cause a user device 110 to modify one or more configurations of the user device 110. For example, a user device 110 may modify a volume configuration to provide an audible sound upon receipt of an event message 102. Continuing the example, the verification data 122 may cause a user device 110 to override current configurations selected by a user 104. If the volume of the user device 110 is currently low or muted, the user device 110 may increase the volume to a greater level responsive to receipt of the verification data 122. As other examples, receipt of the verification data 122 may cause the user device 110 to vibrate, emit light, activate a display, and so forth, independent of the current configurations of the user device 110.

The event messages 102 may include information regarding a determined event and may be communicated using one or more communication channels or one or more types of data. For example, an event message 102 may include alphanumeric data, image data, audio data, or video data, communicated using one or more of SMS, e-mail, a communication via a social network site, or a communication via an application interface. In some implementations, an event message 102 may include content customized to a particular user 104 or user device 110. For example, location data corresponding to a user device 110 may be determined by the notification module 118. The event message 102 provided to the user device 110 may include instructions, a map interface, and so forth, suggesting a route from the current location of the user device 110 to a safe location (e.g., a location not affected by the emergency condition). The content of the event message 102 may be customized based on user data 120 associated with a user 104. For example, a user 104 having limited mobility, such as a user 104 that uses a wheelchair, may be provided with an alternate route accessible to a wheelchair. As another example, the notification module 118 may determine one or more users 104 in an area that may require assistance using sensor data 114, user data 120, and so forth. Event messages 102 provided to users 104 may include requests to assist other users 104, routes that may enable users 104 to encounter other users 104, and so forth.

Upon receipt of an event message 102, a user device 110 may provide confirmation data 124 to the server(s) 108. In some implementations, a user device 110 may provide confirmation data 124 to the server(s) 108 responsive to a user interaction with the user device 110, subsequent to receipt of the event message 102(1). For example, if a user 104 is asleep or incapacitated and does not interact with a corresponding user device 110 subsequent to the event message 102 being provided, confirmation data 124 may not be received from that user device 110. In some implementations, if a threshold length of time passes before receipt of confirmation data 124, the server(s) 108 may provide a subsequent event message 102 to the user device 110. In other implementations, the server(s) 108 may actuate one or more sensors of the user device 110 to determine sensor data 114 that may indicate the current status of the user 104. The server(s) 108 may also cause the user device 110 to emit one or more of sound, light, or vibration to alert the user 104 regarding the event message 102. In still other implementations, event messages 102 to one or more other users 104 may direct the other users 104 to the location of a user 104 that has not confirmed receipt of the event message 102. For example, the failure of a user 104 to confirm receipt of the event message 102 may potentially indicate that the user 104 is incapacitated or otherwise unaware of an emergency condition or other event. Other users 104 may be provided with a prompt by which they may indicate their willingness to assist a potentially incapacitated or unaware user 104. Users 104 that respond affirmatively to the prompt may be provided with an event message 102 that includes content to direct the users 104 to the location of a potentially incapacitated or unaware user 104.

In some implementations, the notification module 118 may access association data 126 associated with one or more users 104. The association data 126 may include contact information for providing notifications 128 to individuals that are associated with the user(s) 104. For example, information regarding one or more friends, family members, or other individuals associated with the user 104 may be provided by the user 104 or determined from a corresponding user device 110. If an event that affects the user 104 is determined, the server(s) 108 may provide one or more notifications 128 to one or more of the other individuals associated with the user 104. For example, FIG. 1 depicts the server(s) 108 providing a notification 128 to a third user device 110(3) associated with a third user 104(3). One or more notifications 128 may be provided to the third user device 110(3) at various times. For example, a notification 128 may be provided when an event message 102 is provided to a user 104. The notification 128 may include the event message 102 or an indication that the event message 102 has been provided. As another example, a notification 128 may be provided when confirmation data 124 is received from a user 104. For example, the notification 128 may include an indication that the user 104 has responded to an event message 102, thereby indicating that the user 104 is not currently incapacitated. In some implementations, a notification 128 may be provided to an associated user 104 when a user 104 within or proximate to an area affected by an event reaches a safe location or when the user 104 transmits a message to the server(s) 108.

A user interaction module 130 may be used to communicate with one or more users 104 during an event. For example, responsive to receipt of an event message 102, a user device 110 may be used to provide additional user communications 112, sensor data 114, or other types of messages or data to the server(s) 108. Continuing the example, a user 104 may provide a message containing additional information about an event, such as portions of the area that are dangerous or impassable, routes that are unusable, services that are unavailable, detours that may be used to avoid or exit dangerous portions of the area, and so forth. The user interaction module 130 may receive such a message, at least a portion of which may be provided to other user devices 110 in subsequent communications. As another example, a user 104 may provide a message to the server(s) 108 requesting additional information or assistance navigating an area. As yet another example, a user 104 may provide a message to the server(s) 108 or to one or more other user devices 110 requesting the assistance of other users 104, such as due to incapacity or injury of the user 104 or another individual within the area. One or more other users 104 may provide return communications to the user 104 using the server(s) 108 or other computing devices in communication with the server(s) 108. In some implementations, the user interaction module 130 may provide an interface, such as a chat interface, to multiple users 104 within an area to permit the users 104 to communicate with one another. Communications between users 104 may be processed by the server(s) 108 or moderated by an individual associated with the system 100. In other implementations, multiple user devices 110 may establish an ad hoc network to enable communication within an area when other communication infrastructures may be unavailable. For example, user devices 110 may be used to establish a "store and forward" network, in which a first user device 110 may receive and store a message, then send the message to a subsequent user device 110 when the subsequent user device 110 is within range of the first user device 110. In the absence of communication infrastructures, such as cellular or wireless networks, user devices 110 may communicate using Bluetooth, near field communication (NFC) or other types of peer-to-peer communications.

Figure 2:
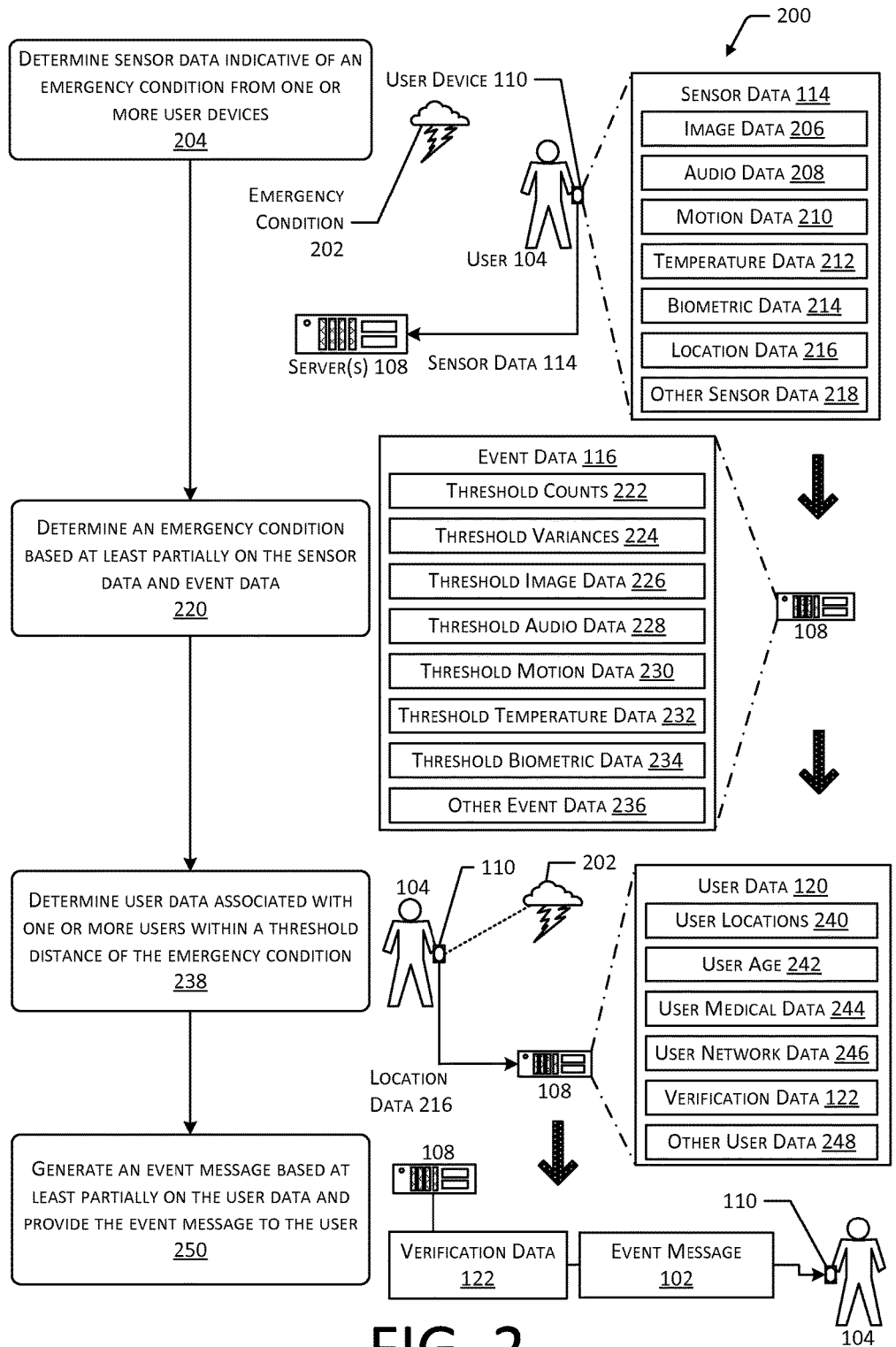
FIG. 2 illustrates a method for determining an emergency condition from sensor data and generating an event message based at least partially on user data associated with a user proximate to the emergency condition.

FIG. 2 illustrates a method 200 for determining an event, such as an emergency condition 202, based on sensor data 114 determined from one or more user devices 110 and generating event messages 102 to be provided to user devices 110 proximate to the event.

At 204, sensor data 114 indicative of an emergency condition 202 may be determined from one or more user devices 110. For example, a mobile device or other type of user device 110 associated with a user 104 within a threshold distance of an area affected by an emergency condition 202 may acquire sensor data 114 indicative of the emergency condition 202. In some implementations, the sensor data 114 may be provided by the user device 110 to one or more servers 108 responsive to the determination of sensor data 114 having one or more threshold values. In other implementations, the sensor data 114 may be determined from the user device 110 by the server(s) 108 periodically or responsive to certain threshold events. For example, upon receipt of one or more user communications 112 indicative of the emergency condition 202, sensor data 114 from one or more user devices 110 or other devices within an area, and so forth, an event determination module 106 associated with the server(s) 108 may determine the sensor data 114 from the user device 110 to verify the presence of the emergency condition 202. In other implementations, the event determination module 106 may provide a prompt to one or more user devices 110 requesting confirmation by a user 104 of the presence or absence of an emergency condition 202 or permission to access sensor data 114 associated with the user device 110.

Emergency conditions 202 may include natural occurrences, such as tornadoes, hurricanes, blizzards, and other forms of inclement weather, earthquakes, volcanic eruptions, extreme temperatures, or other types of events that may be associated with a danger to life, health, property, or environment. Emergency conditions 202 may also include natural or non-natural occurrences specific to one or more structures or areas, such as a fire, a flood, a power outage, and so forth. Emergency conditions 202 may further include occurrences specific to one or more users 104, such as a fall, a cardiac event, a vehicular accident, and so forth. In some implementations, an emergency condition 202 may include one or more events indicative of a potential emergency condition 202 or a future emergency condition 202, such as changing winds, temperature, air pressure, and so forth. In other implementations, the event determination module 106 may determine a planned or unplanned event, that may not necessarily include an emergency, associated with a decrease in accessibility to one or more networks by one or more user devices 110, an impediment to travel along one or more routes, a loss of one or more services (e.g., electrical power, public transportation) within an area, and so forth. For example, the event determination module 106 may determine a power outage, a public event that may impede travel along a particular route, or a train that is not currently running resulting in a loss of service.

Sensor data 114 may include image data 206. Image data 206 may be acquired using cameras or other types of image sensors associated with the user device 110. Image data 206 may include images of the user 104, the area associated with the emergency condition 202, features of the emergency condition 202, ambient light within or proximate to the area, and so forth. Image data 206 may be processed by the server(s) 108, such as by use of image recognition or image processing to determine features of an object, area, or user 104 that is depicted. Image processing may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. For example, the OpenCV library may be used to detect faces or determine a relative position of facial features such as eyes, mouth, nose, and so forth.

Sensor data 114 may include audio data 208. Audio data 208 may be acquired using microphones or other types of audio sensors associated with the user device 110. Audio data 208 may include sound produced by the emergency condition 202, the user 104, other individuals within or proximate to an area affected by the emergency condition 202, objects within the area, and so forth. The audio data 208 may be processed by the server(s) 108 to identify specific sounds, such as human screams exceeding a threshold volume, thunder, extreme wind, a collapsing structure, and so forth. In other implementations, the audio data 208 may be processed to identify specific features of sounds that may be indicative of the emergency condition 202, such as volume, pitch, rate, and so forth.

Sensor data 114 may include motion data 210. Motion data 210 may be acquired using one or more motion sensors, position sensors, or orientation sensors, and so forth, associated with the user device 110. For example, an accelerometer associated with the user device 110 may determine that the user device 110 is moving at a rate of speed indicative of running, traveling in a vehicle, and so forth. A gyroscope associated with the user device 110 may determine that the user 104 associated with the user device 110 is most likely standing or sitting upright. A sudden decrease in speed determined by the accelerometer, coupled with a change in orientation indicating that the user 104 may be prone, determined by the gyroscope, may indicate that the user 104 has fallen, impacted an object, and so forth. As another example, vibration of the user device 110 may indicate an earthquake, strong winds, a seizure affecting the user 110, and so forth.

Sensor data 114 may include temperature data 212. Temperature data 212 may be acquired using a thermometer or other type of temperature sensor associated with the user device 110. The temperature data 212 may be used to determine extreme temperatures indicative of one or more types of emergency conditions 202, such as a blizzard, a heat wave, potentially dangerous hot or cold temperatures, and so forth.

Sensor data 114 may include biometric data 214. Biometric data 214 associated with a user 104 may be determined using one or more biometric sensors, such as monitors for determining a user's 104 heart rate, blood oxygen level, blood pressure, temperature, breath rate, and so forth. The biometric data 214 may be used to determine a cardiac or respiratory event, a high fever or hypothermia, a seizure, physiological indications of panic, or other biometric incidents that may constitute an emergency condition 202.

Sensor data 114 may also include location data 216. Location data 216 may include a current location of the user device 110, which may be determined using a GPS receiver or another type of navigation system, one or more networks associated with the user device 110, and so forth. The location data 216 may be used to determine whether the user device 110 is within a threshold distance of an emergency condition 202 and possible routes between the current location of the user device 110 and another location, such as a shelter location or a location outside of the area affected by the emergency condition 202.

Other sensor data 218 may include any type of data determined using any sensors or input devices associated with the user device 110. For example, the presence and consciousness of a user 104 may be determined through the user's 104 actuation of a touchscreen, buttons, keyboard, mouse device, and so forth. Data, such as user communications 112, received from a user 104 responsive to a prompt or an event message 102 may also indicate the presence and consciousness of a user 104.

At 220, the presence or absence of an emergency condition 202 may be determined based at least partially on sensor data 114 determined from the user device(s) 110 and on event data 116 stored in association with the server(s) 108. The event data 116 may include one or more threshold values that correspond to user communications 112, and an amount or value of sensor data 114 determined from user devices 110. Correspondence or lack of correspondence between the determined sensor data 114 and the event data 116 may be used to determine the presence or absence of an emergency condition 202 or other type of event, as described below.

For example, the event data 116 may include one or more threshold counts 222, representative of a number of user communications 112 that may be received prior to determination of an event. Continuing the example, a threshold count 222 of user communications 112 may include three user communications 112. If fewer than three user communications 112 indicative of an emergency condition 202 are received, the user communications 112 may be disregarded until additional user communications 112 are received. When three or more user communications 112 indicative of the emergency condition 202 are received, the emergency condition 202 may be determined based on the count of received user communications 112 meeting or exceeding a threshold count 222 of user communications 112. As another example, the threshold counts 222 may include a count of sensor data 114 values indicative of an emergency condition 202 that may be received prior to determination of the emergency condition 202. If sensor data 114 from a count of user devices 110 less than or equal to the threshold count 222 of sensor data 114 values is received, the sensor data 114 may be disregarded until additional sensor data 114 values are received. When a count of sensor data 114 values equal to or exceeding the threshold count 222 of sensor data 114 values is received, the emergency condition 202 may be determined.

The event data 116 may include one or more threshold variances 224. A threshold variance 224 may include an amount by which a sensor data 114 value may differ from a threshold value of the event data 116 to determine the presence or absence of an event. For example, depending on the type of information to which a sensor data 114 value corresponds, the relationship between the sensor data 114 value and a corresponding threshold value of the event data 116 may differ. Continuing the example, an emergency condition 202 may be determined if a sensor data 114 value relating to temperature equals or exceeds a threshold event data 116 value. In another example, an emergency condition 202 may be determined if a sensor data 114 value relating to ambient light differs from a threshold event data 116 value by more than a threshold variance 224 in either a positive or negative direction. As another example, an emergency condition 202 may be determined if a sensor data 114 value relating to audio volume fails to meet or fails to exceed a threshold event data 116 value. The threshold variances 224 may be preselected by users 104 or by individuals associated with the system 100.

The event data 116 may include threshold image data 226. Threshold image data 226 may include a quantity of light, the presence, absence, or quantity of one or more colors, the presence, absence, or clarity of one or more objects, and so forth. For example, threshold image data 226 may include data indicative of an amount of ambient light, colors, or images that correspond to a fire (e.g., bright light, orange colors, images of fires), inclement weather (e.g., dim light, gray clouds), a structural collapse, an injury to a user 104 (e.g., a prone or non-standard position of a body, presence of blood), and so forth. Image data 206 determined from a user device 110 may be compared to the threshold image data 226. If the image data 206 determined from the user device 110 falls within a threshold variance 224 of the threshold image data 226, an emergency condition 202 may be determined. For example, image data 206 that includes a quantity of ambient light and a quantity of orange coloring may correspond to threshold image data 226 indicative of a fire. In other implementations, if the image data 206 determined from the user device 110 deviates from the threshold image data 226 by more than a threshold variance 224, an emergency condition 202 or other event may be determined. For example, an absence of ambient light at a location and time where ambient light is expected may indicate inclement weather or a power outage.

The event data 116 may include threshold audio data 228. Threshold audio data 228 may include a volume, pitch, frequency, rate, tone, or other characteristic of ambient sound, or data corresponding to one or more specific types of sounds. For example, threshold audio data 228 may include data indicative of audio characteristics that correspond to fire, thunder, wind, rain, structural collapse, screams, words or phrases that may indicate an emergency condition 202, and so forth. Audio data 208 determined from a user device 110 may be compared to the threshold audio data 228. If the audio data 208 determined from the user device 110 equals or exceeds the threshold audio data 228, an emergency condition 202 or other event may be determined. For example, an audible sound having a volume, pitch, duration, and so forth, that may correspond to an alarm, strong wind, thunder, or an earthquake may have characteristics that exceed characteristics of the threshold audio data 228. In other implementations, if the audio data 208 determined from the user device 110 deviates from the threshold audio data 228 by more than a threshold variance 224 in a negative direction, an event may be determined. For example, an absence of sound in an area where audible sound is expected, such as a room containing generators or other machinery, may indicate that the machinery has failed. In some implementations, the threshold audio data 228 may vary based on the location data 216 determined from a user device 110. For example, at a first location, such as an area proximate to an industrial structure, an ambient level of noise may be greater than the ambient level of noise present at a second location, such as a library.

The event data 116 may include threshold motion data 230. Threshold motion data 230 may include an amount or rate of vibration, a rate of speed, a direction of movement, one or more orientations or positions of a user device 110, and so forth. For example, a rate of movement of a user device 110 may indicate that a user 104 is running or traveling in a vehicle. A sudden change in the rate of movement may indicate an impact, a vehicular accident, or a fall. A rate or duration of determined vibrations may indicate the presence of strong wind or an earthquake, loud music, the presence of a large number of individuals, and so forth. A rate or duration of vibrations may indicate that the user 104 is affected by a seizure or other medical condition. If the motion data 210 received from the user device 110 falls within a threshold variance 224 of the threshold motion data 230, an emergency condition 202 or other event may be determined. In other implementations, if the motion data 210 determined from a user device 110 changes at a rate that exceeds a threshold variance 224, an emergency condition 202 may be determined. In some implementations, the threshold motion data 230 may vary based on the location data 216 determined from a user device 110. For example, at one or more locations, such as an area near an airport, freeway, or railroad track, an ambient level of vibration may be greater than the ambient level of vibration present at other locations, such as within a residential neighborhood.

The event data 116 may include threshold temperature data 232. The threshold temperature data 232 may include one or more ranges of temperatures that may indicate the presence or absence of an emergency condition 202 or other event. Temperature data 212 determined from a user device 110 may be compared to the threshold temperature data 232. If the temperature data 212 determined from the user device 110 deviates from the threshold temperature data 232 by a threshold variance 224, an emergency condition 202 or event may be determined. For example, determination of temperature data 212 that indicates an ambient temperature exceeding or falling below a range of temperatures considered safe for humans may indicate an emergency condition 202. In some implementations, the threshold temperature data 232 may vary based on the location data 216 determined from a user device 110. For example, an expected ambient temperature at a first location, such as a region near the equator, may exceed the expected ambient temperature at a second location remote from the equator.

The event data 116 may also include threshold biometric data 234. The threshold biometric data 234 may include baseline pulse rates, breath rates, temperatures, amounts of perspiration, electrocardiographic data, and so forth. In some implementations, the threshold biometric data 234 may correspond to a particular user 104. For example, electrocardiographic data corresponding to a particular user 104 may be stored as threshold biometric data 234. In other implementations, the threshold biometric data 234 may include one or more general standards applicable to all users 104. For example, cessation of breathing or a body temperature exceeding one hundred four degrees Fahrenheit may indicate an emergency condition 202 independent of the particular user 104 from which the biometric data 214 is determined. If biometric data 214 determined from a user device 110 deviates from threshold biometric data 234 by a threshold variance 224, an emergency condition 202 may be determined. In other implementations, the threshold biometric data 234 may correspond to values that indicate an emergency condition 202, which may be determined when biometric data 214 falls within a threshold variance 224 of the threshold biometric data 234.

Other event data 236 may include threshold locations that may be safe or unsafe. Location data 216 may be determined from a user device 110 to determine whether a user 104 is within a threshold distance of a safe or unsafe location. Threshold distances may also be used to determine whether a user device 110 is proximate to or remote from an area affected by an emergency condition 202 or other event. Other event data 236 may include threshold lengths of time. For example, a user 104 may fail to interact with a user device 110 subsequent to an event message 102 being provided to the user device 110. If an interaction is not received from the user 104 within a threshold length of time, additional event messages 102 may be provided to the user 104 or to other users 104 within the area.

At 238, user data 120 associated with one or more users 104 within a threshold distance of the emergency condition 202 may be determined. For example, location data 216 associated with a user device 110 may be used to determine a current location of the user device 110. The current location of one or more user devices 110 may be determined to be within a threshold distance of an area affected by the emergency condition 202. User data 120 associated with at least a portion of the user devices 110 within the threshold distance of the area may be determined and used for generation of event messages 102.

User data 120 may include user locations 240. User locations 240 may include one or more particular locations associated with a user 104, such as a user's 104 residence address or employment address. User locations 240 may be provided by a user 104 or determined from location data 216 associated with a user device 110. User locations 240 may be used to determine the content of an event message 102 provided to a user device 110. For example, an event message 102 may include a route from a user's 104 current location to the user's residence address.

User data 120 may include a user age 242. A user age 242 may include a specific age, such as five years old. In another implementation, a user age 242 may include a category or range indicative of one or more ages, such as "child," "adult," "senior," and so forth. The content of an event message 102 may be determined at least partially based on the user age 242. For example, content provided to a child may include language intended for comprehension by children or may omit graphic language or images. In some implementations, suggested routes or instructions regarding future actions may be customized based on the user age 242. For example, certain routes may be unusable by elderly or child-aged users 104. In other implementations, event messages 102 provided to certain users 104 may include instructions to meet or assist other users 104 based on the user age 242 associated with one or more of the users 104.

User data 120 may include user medical data 244. User medical data 244 may include one or more medical conditions that may affect the capabilities of a user 104 during an emergency condition 202 or other event. For example, a user 104 may have limited mobility, limited mental faculties, a medical condition that precludes running or exposure to certain areas or substances, and so forth. As another example, a user 104 may be blind, deaf, mute, unable to smell or taste, colorblind, dyslexic, unable to perform certain interactions with a user device 110, and so forth. Event messages 102 provided to users 104 may include content that accounts for the user medical data 244. For example, a map interface having high contrast, black and white features may be presented to a colorblind user 104 in place of a colored map interface.

User data 120 may include user network data 246. User network data 246 may include one or more networks or channels of communication that may be used to provide event messages 102 to a user 104. For example, user network data 246 may include one or more characteristics of the user device 110, such as the capability for the user device 110 to access one or more types of networks. User network data 246 may also include telephone numbers or e-mail addresses associated with the user 104, contact information for contacting the user 104 using a social media site, and so forth.

User data 120 may also include the verification data 122. As described previously, verification data 122 may include a password or alphanumeric string selected by a user 104 or a provider of an event message 102. In other implementations, verification data 122 may include a digital certificate, registration key, or other type of data that may be recognized by one or more of the user device 110 or the server(s) 108 and used to authenticate user devices 110, servers 108, event messages 102, user communications 112, users 104, and so forth. The verification data 122 may be provided to a user device 110 prior to or concurrent with an event message 102 to verify the authenticity of the event message 102. For example, a user device 110 may disregard event messages 102 that are received in the absence of verification data 122.

Other user data 248 may include additional information relevant to a user 104 or to a user device 110, such as a user's 104 gender, characteristics of the display, speakers, or other output components of the user device 110, and so forth. For example, an event message 102 provided to a user device 110 lacking a display may include solely audible content.

At 250, an event message 102 based at least partially on the user data 120 determined for a user 104 may be generated. The event message 102 may be provided to the user 104. As described previously, the content of an event message 102 may include an indication of the emergency condition 202. However, the content of the event message 102 may vary depending on one or more of the sensor data 114 or the user data 120. For example, an event message 102 may include a route based on a current location of a user device 110 or a location of a user's 104 residence address. As another example, an event message 102 may include instructions that account for mobility restrictions or disabilities of a user 104. Verification data 122 may be provided prior to or concurrent with the event message 102. Receipt of the verification data 122 by the user device 110 may cause the user device 110 to begin processing the event message 102. In some implementations, receipt of the verification data 122 may cause the user device 110 to modify one or more configurations of the user device 110. For example, the user device 110 may modify a volume setting, a haptic setting, or an illumination setting thereof responsive to receipt of the verification data 122.

Figure 3:
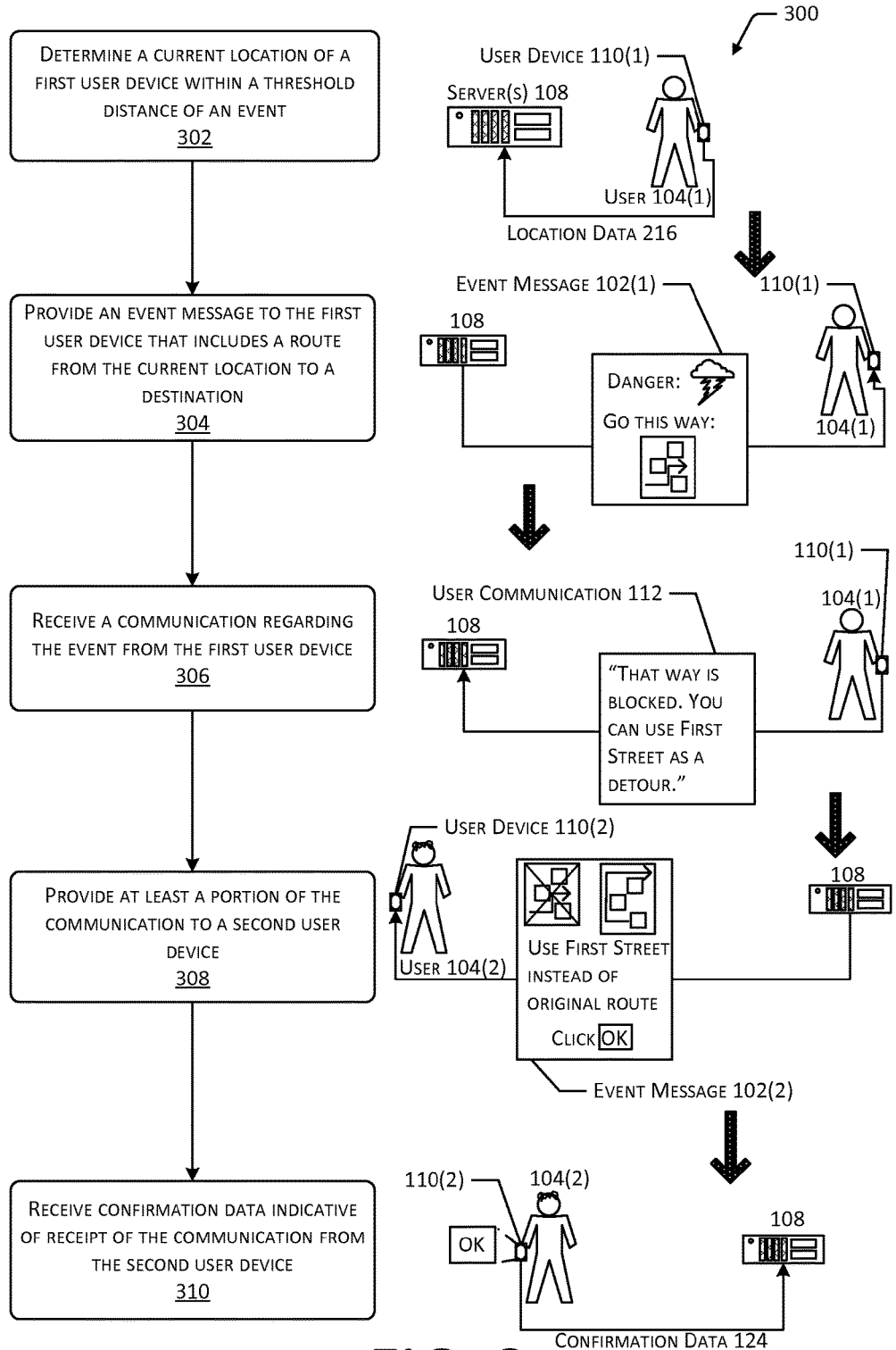
FIG. 3 illustrates a method for providing an event message based on a user location, receiving a communication from a user, and providing at least a portion of that communication to another user.

FIG. 3 illustrates a method 300 for providing an event message 102 to a user 104 based on a current location of the user 104, receiving a communication from the user 104, and providing at least a portion of that communication to another user 104. At 302, a current location of a first user device 110(1) within a threshold distance of an event may be determined. Events may include emergencies or other types of events that may impact the availability of communication, travel, transport, power, and so forth. For example, location data 216 may be determined, by one or more servers 108, from a first user device 110(1) associated with a first user 104(1). The location data 216 may be determined by the first user device 110(1) or server(s) 108 using a GPS receiver or another type of location system. If the first user device 110(1) is determined to be within a threshold distance of an area affected by an event, an event message 102 may be generated and provided to the first user device 110(1). If the first user device 110(1) is not within a threshold distance of any determined event, the server(s) 108 may refrain from generating an event message 102 for receipt by the first user device 110(1).

At 304, an event message 102(1) may be provided to the first user device 110(1). The event message 102(1) may include a route from the current location of the first user device 110(1) to a location unaffected by the event, such as a shelter location during an emergency or a location outside of the area affected by the event. As described previously, a notification module 118 associated with the server(s) 108 may determine user data 120 associated with the first user device 110(1). The user data 120 may include location data 216 indicative of the current location of the first user device 110(1). The event message 102(1) generated by the notification module 118 may include content based at least partially on the user data 120. For example, FIG. 3 depicts the event message 102(1) including an indication of an emergency condition 202 (e.g., inclement weather) proximate to the current location of the first user device 110(1) and a graphical indication of a suggested route from the current location of the first user device 110(1) to a safe location. An identical or similar event message 102(1) may also be sent to one or more additional user devices 110, such as a second user device 110(2) associated with a second user 104(2) within the area.

At 306, a communication regarding the event may be received from the first user device 110(1). For example, a user interaction module 130 associated with one or more of the first user device 110(1) or the server(s) 108 may provide a prompt to the first user device 110(1) or receive an interaction from the first user 104(1). Continuing the example, responsive to the event message 102(1), the first user 104(1) may generate a user communication 112 indicating that the suggested route included in the event message 102(1) is impassable, dangerous, inefficient, and so forth. In the depicted method 300, the user communication 112 includes a suggested detour due to the impassability of the route contained in the event message 102(1).

At 308, at least a portion of the user communication 112 may be provided to a second user device 110(2). In some implementations, the user communication 112 may be processed by one or more of the user interaction module 130 or the notification module 118 to determine content suitable to be provided to other users 104 or to generate one or more additional event messages 102(2) based on the user communication 112. In other implementations, an individual associated with the system 100 may receive the user communication 112 and determine a subsequent action. For example, the individual associated with the system 100 may provide a responsive communication to the first user device 110(1), generate additional event messages 102(2) to be provided to the first user device 110(1) or other user devices 110, and so forth. For example, FIG. 3 depicts the server(s) 108 providing a second event message 102(2) to the second user device 110(2) associated with a second user 104(2). The second event message 102(2) may include a message indicating the detour received by the server(s) 108 from the first user device 110(1), a graphical indication of a suggested route for the second user 104(2) based on the user communication 112, and a prompt to confirm receipt of the second event message 102(2) by the second user 104(2). In some implementations, to reduce the bandwidth used during an event, the second event message 102(2) may include a modification to the first event message 102(1) provided to the second user 104(2). For example, the second event message 102(2) may include vector information or similar data that may be used to update a map or other graphical indication of a suggested route. Use of an event message 102 to update an existing map or similar graphic rather than providing a replacement graphic may facilitate the efficiency and reduce the bandwidth consumed by the system 100. In some implementations, the event message 102 may include low-bandwidth content that executes, modifies, or interacts with preexisting content stored on a user device 110. For example, an event message 102 may include vector information that may be used to generate a route on a map image stored locally on a user device 110.

At 310, the server(s) 108 may receive confirmation data 124 indicative of receipt of the event message 102(2) from the second user device 110(2). As described previously, in some implementations, the second user device 110(2) may be provided with a prompt or other request for a user interaction subsequent to providing the event message 102(2) to the second user device 110(2). Responsive to the user interaction with the second user device 110(2), confirmation data 124 may be provided to the server(s) 108. In some implementations, if confirmation data 124 is not received from the second user device 110(2), the server(s) 108 may provide additional communications to the second user device 110(2) or to other users 104 to assist a second user 104(2) that may be potentially incapacitated, injured, or unaware of an emergency condition 202 or other event.

Figure 4:
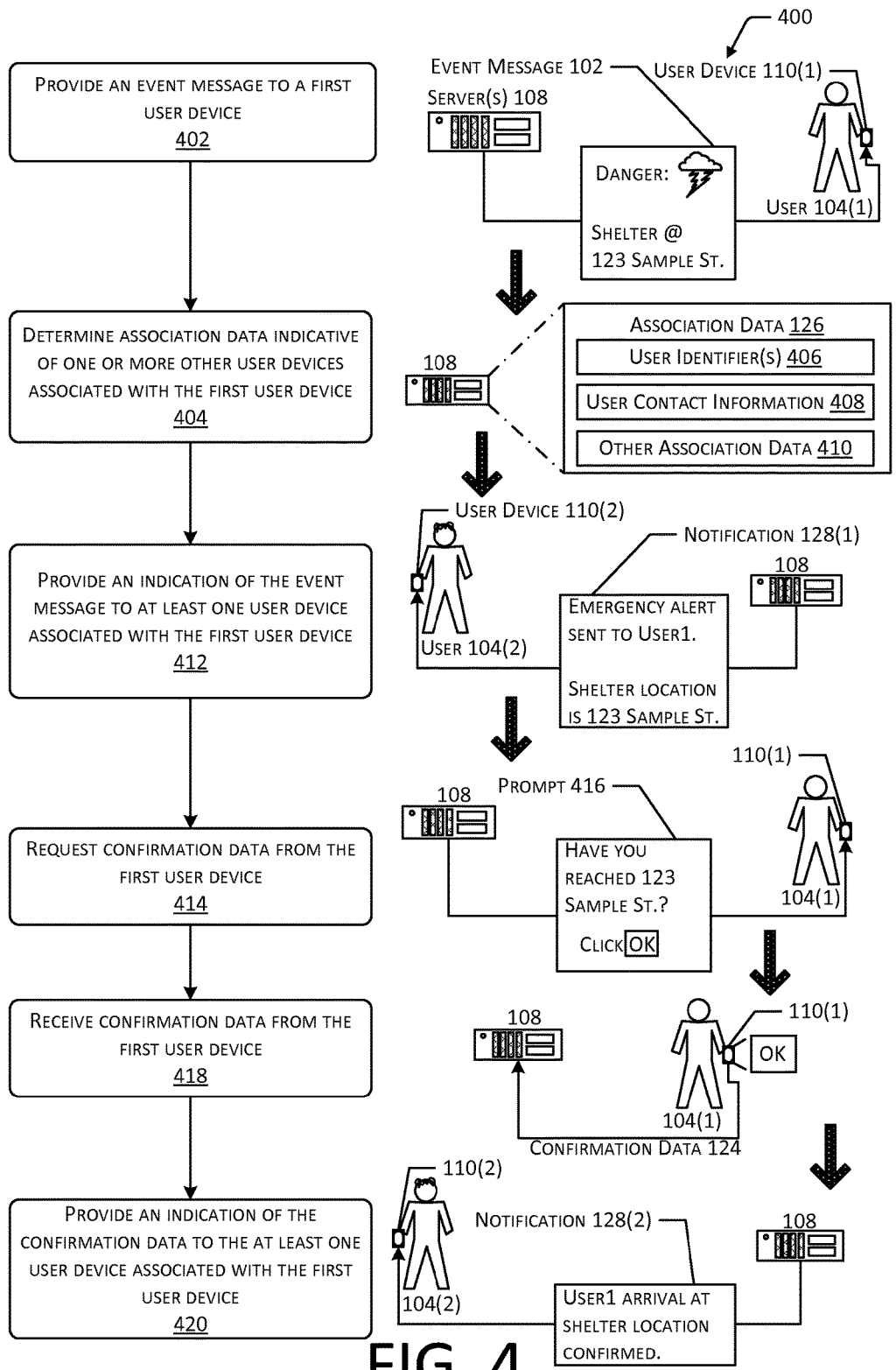
FIG. 4 illustrates a method for providing notifications to users associated with a first user based on association data.

FIG. 4 illustrates a method 400 for providing notifications 128 to users 104 associated with a first user 104(1) based on association data 126. At 402, an event message 102 is provided to a first user device 110(1). As described previously, a notification module 118 associated with one or more servers 108 may determine one or more user devices 110 within a threshold distance of an emergency condition 202. An event message 102 based at least partially on user data 120 associated with a first user 104(1) of a first user device 110(1) may be provided to the first user device 110(1). For example, FIG. 4 depicts an event message 102 that includes an indication of an emergency condition 202 and an address of a shelter location.

At 404, association data 126 indicative of one or more other user devices 110 associated with the first user device 110(1) may be determined. In some implementations, association data 126 may be provided to the server(s) 108 by the first user 104(1). For example, the first user 104(1) may provide contact information of other users 104. The other users 104 may receive one or more communications in the event that an emergency condition 202 occurs proximate to the first user 104(1). In other implementations, association data 126 may be determined from the first user device 110(1). For example, the first user device 110(1) may include an address book or similar list of contacts, a history of communications via phone, SMS, e-mail, one or more social media sites, and so forth. Continuing the example, the first user 104(1) may be a child attending school at the time that the event message 102 is provided to the first user device 110(1), while a second user 104(2) determined from the association data 126 is a parent of the child.

Association data 126 may include one or more user identifiers 406 that correspond to users 104 associated with the first user 104(1). A user identifier 406 may include a name, a telephone number, an e-mail address, or another type of identifier that may differentiate one user 104 from other users 104. User contact information 408 for one or more channels of communication may be stored in association with at least a portion of the user identifiers 406. For example, the user contact information 408 may include one or more of a telephone number, an e-mail address, or a social network address by which a second user 104(2) may be contacted. One or more of the first user 104(1) or the second user 104(2) may select particular user contact information 408 to be used to contact the second user 104(2). For example, the second user 104(2) may indicate a preference to receive communications from the server(s) 108 using SMS. The second user 104(2) may also indicate that in the event a SMS communication fails, the second user 104(2) prefers to receive a communication using e-mail. Other association data 410 may include other information regarding associated users 104, such as demographic information, location data 216, and so forth. For example, based on location data 216 associated with the second user 104(2) that indicates a location proximate to that of the first user 104(1), a communication provided to the second user 104(2) may include a request to assist the first user 104(1).

At 412, an indication of the event message 102 may be provided to at least one user device 110 associated with the first user device 110(1). FIG. 4 depicts a second user device 110(2) associated with a second user 104(2), which may be determined from association data 126 of the first user device 110(1). The server(s) 108 may provide a notification 128(1) to the second user device 110(2) indicative of the event message 102 provided to the first user device 110(1). For example, the notification 128(1) may indicate one or more of the fact that an event message 102 was provided, the event message 102 itself, the nature of the emergency condition 202, all or a portion of instructions contained in the event message 102, such as the address of a shelter location, and so forth. Continuing the example, the notification 128(1) may indicate that the first user 104(1) has confirmed receipt of the event message 102. During an emergency condition 202 or other event, cellular networks and other types of communication networks may become damaged. Additionally, during an emergency condition 202, the bandwidth of networks may be impacted as numerous individuals attempt to confirm the safety of individuals affected by the emergency condition 202. Event messages 102 and notifications 128 confirming that a user 104 has received an event message 102, thereby confirming the safety of the user 104, may include low-bandwidth communications. Event messages 102 and notifications 128 may therefore be received by associated users 104, such as parents of children, when other means of communication are impacted by the emergency condition 202. Additionally, the receipt of notifications 128 indicating the safety of users 104 within areas affected by an emergency condition 202 may prevent associated users 104 from attempting communication using other networks, which may reduce the consumption of bandwidth associated with those networks.

At 414, confirmation data 124 may be requested from the first user device 110(1). For example, a prompt 416 or similar request may be provided to the first user device 110(1) requesting an interaction by the first user 104(1) to confirm capacity of the first user 104(1), receipt of a message, arrival at a safe location, and so forth. A prompt 416 may be provided periodically or upon determination of certain circumstances. For example, a prompt 416 may be provided to the first user device 110(1) subsequent to providing the event message 102 to the first user device 110(1) to confirm receipt of the event message 102 and awareness of the user 104(1). As another example, a prompt 416 may be provided to the first user device 110(1) upon a lapse of a threshold length of time subsequent to providing the event message 102 to the first user device 110(1). As yet another example, a prompt 416 may be provided to the first user device 110(1) upon determination that the first user device 110(1) has reached a destination location or another location, such as a location that deviates from a route suggested in the event message 102. Location data 216 may be used to determine a current location from the first user device 110(1). FIG. 4 depicts a prompt 416 requesting confirmation that the first user 104(1) has reached a shelter location.

At 418, confirmation data 124 may be received from the first user device 110(1). For example, a first user 104(1) may interact with a button, touchscreen, mouse device, or other input device associated with the user device 110(1) to provide a response to the prompt 416. Responsive to the user interaction, confirmation data 124 may be provided from the first user device 110(1) to the server(s) 108.

At 420, an indication of the confirmation data 124 may be provided to at least a second user device 110(2) associated with the first user device 110(1). For example, a notification 128(2) indicating that the first user 104(1) has interacted with the first user device 110(1) (e.g., responsive to a prompt 416) may be provided to the second user device 110(2). FIG. 4 depicts the notification 128(2) including a message confirming arrival of the first user 104(1) at a shelter location.

Notifications 128 may be provided to users 104 associated with a first user 104(1) responsive to one or multiple events. For example, FIG. 4 depicts the second user device 110(2) receiving a first notification 128(1) when an event message 102 is provided to the first user device 110(1) and a second notification 128(2) when confirmation data 124 is received from the first user device 110(1). In other implementations, a notification 128 may be provided to the second user device 110(2) when the first user device 110(1) provides a user communication 112 to the server(s) 108 responsive to the event message 102. In still other implementations, one or more of the first notification 128(1) or the second notification 128(2) may be omitted. In some implementations, certain notifications 128 may be provided to one or more users 104 associated with the first user 104(1), while other notifications may be provided to other associated users 104. For example, a first associated user 104 may receive a notification 128 when an event message 102 is provided to the first user 104(1), while a second associated user 104 may receive a notification 128 when confirmation data 124 is received from the first user device 110(1).

Figure 5:
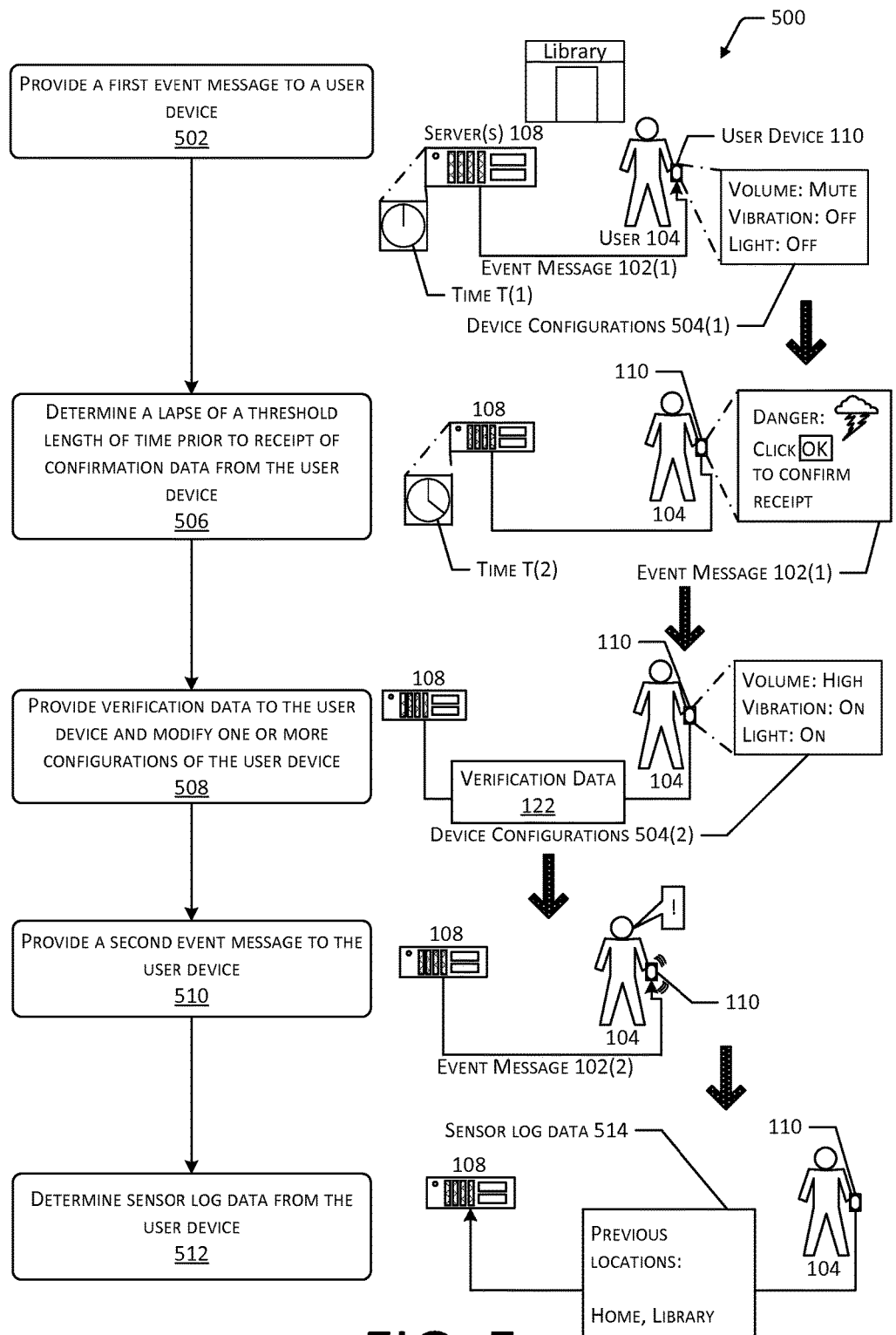
FIG. 5 illustrates a method for modifying configurations of a user device to alert a user regarding an event message and to determine sensor log data from the user device.

FIG. 5 illustrates a method 500 for modifying configurations of a user device 110 to alert a user 104 regarding an event message 102 and to determine sensor log data from the user device 110. At 502, a first event message 102(1) is provided to a user device 110. For example, at a first time T(1), one or more servers 108 may provide the first event message 102(1) to a mobile device or other type of user device 110 associated with a user 104. The user device 110 may include one or more device configurations 504(1), which may be selected by the user 104. For example, due to a current location (e.g., a library) or a current activity (e.g., sleeping) of the user 104, the device configurations 504(1) may include a low or muted volume and inactive haptic and illumination components.

At 506, a lapse of a threshold length of time prior to receipt of confirmation data 124 from the user device 110 may be determined. For example, the first event message 102(1) may include a request for an interaction by the user 104 to confirm receipt of the first event message 102(1). If the user 104 does not interact with the user device 110 to confirm receipt of the first event message 102(1), this may indicate that the user 104 is incapacitated or unaware of the first event message 102(1). The threshold length of time may be preselected by the user 104 or by the system 100. In some implementations, the threshold length of time may differ depending on the nature of the first event message 102(1) or of the determined event. For example, if a user interaction is not determined by a second time T(2), the server(s) 108 may provide additional communications or determine additional data, as described below.

At 508, verification data 122 may be provided to the user device 110, and one or more configurations of the user device 110 may be modified responsive to receipt of the verification data 122. For example, verification data 122 or event messages 102 provided by the server(s) 108 may be configured to cause the user device 110 to modify one or more of the device configurations 504 or to permit configurations of the user device 110 to be modified by the server(s) 108. In other implementations, computer-executable instructions associated with one or more of the user device 110 or the server(s) 108 may be configured to modify one or more of the device configurations 504 subsequent to the lapse of the threshold length of time. FIG. 5 depicts the server(s) 108 providing verification data 122 to the user device 110 and modified device configurations 504(2) that include a volume of "high" and active vibration and illumination components.

At 510, a second event message 102(2) may be provided to the user device 110. In some implementations, the second event message 102(2) may include content identical to the first event message 102(1). In other implementations, the second event message 102(2) may include additional content, less content, or different content. Due to the modified device configurations 504(2), receipt of the second event message 102(2) may cause the user device 110 to vibrate, emit sound, emit light, and so forth. In some implementations, the second event message 102(2) may not include a message, itself, but may instead cause the user device 110 to generate an alert, such as a sound, vibration, or emission of light. The alert may be provided to cause the user 104 to access the first event message 102(1) previously provided to the user device 110.

At 512, sensor log data 514 may be determined from the user device 110. Sensor log data 514 may include sensor data 114 obtained by the user device 110 for a length of time prior to determination of the emergency condition 202. For example, the sensor log data 514 may include a location history associated with the user device 110. In other implementations, the sensor log data 514 may include image data, audio data, motion data, and so forth, for a period of time prior to the determined event.

In some implementations, sensor log data 514 may be obtained when a user 104 does not provide confirmation data 124 responsive to an event message 102. For example, after the lapse of a threshold length of time, the server(s) 108 may access the user device 110 to determine one or more of sensor data 114 or sensor log data 514. In other implementations, sensor log data 514 may be obtained at the time that an event message 102 is provided to the user device 110. For example, verification data 122 or event messages 102 may be configured to cause the user device 110 to provide sensor log data 514 to the server(s) 108. In still other implementations, sensor log data 514 may be obtained from one or multiple user devices 110 periodically and may be used to determine the presence of an emergency condition 202. For example, movement, sound, or images associated with multiple user devices 110 within or proximate to an area may be used to determine a possible emergency condition 202 associated with the area.

Figure 6:
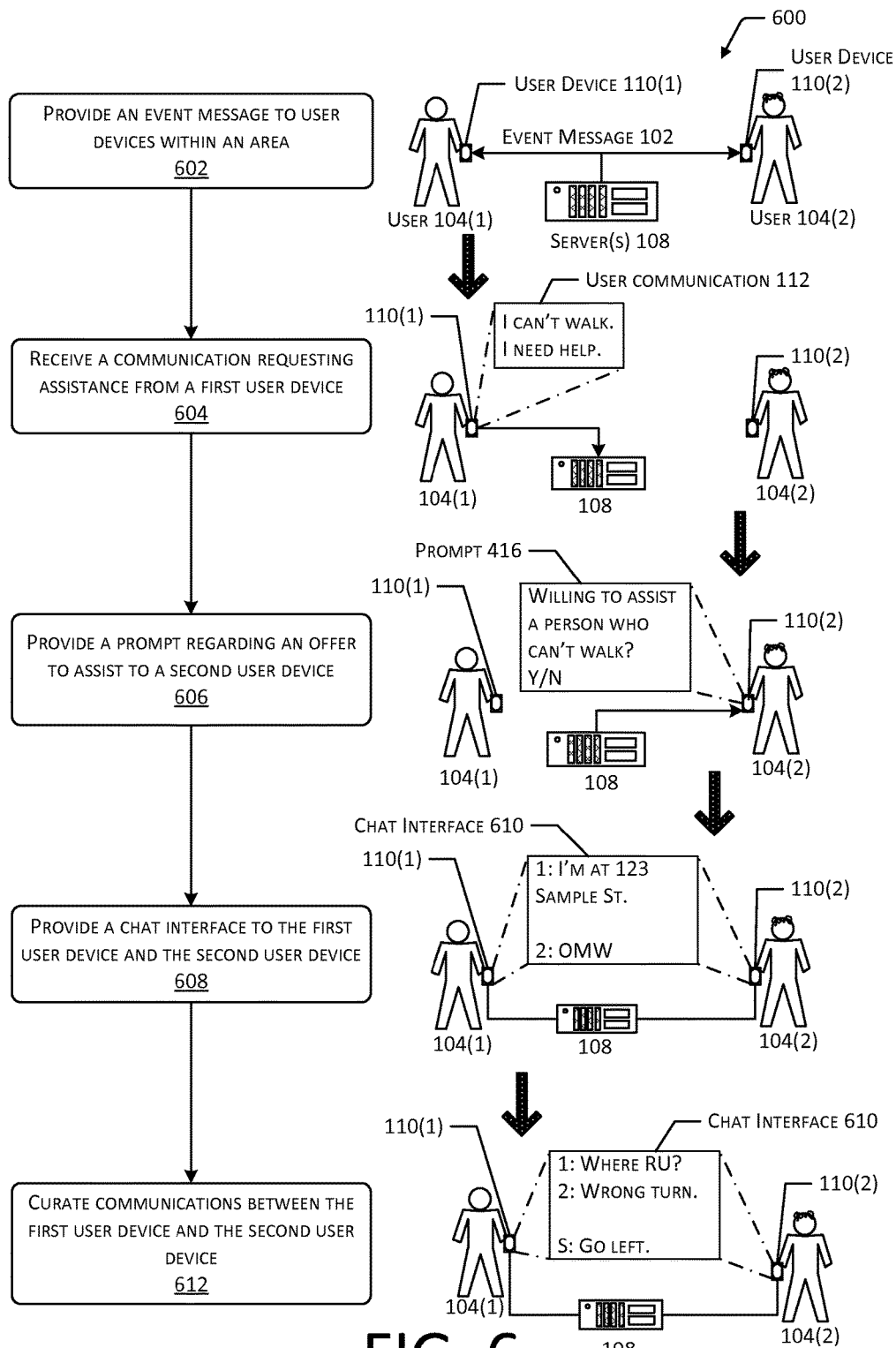
FIG. 6 illustrates a method for providing a chat interface to users and moderating communications between the users.

FIG. 6 illustrates a method 600 for providing a chat interface to users 104 and moderating communications between the users 104. At 602, an event message 102 may be provided to user devices 110 within an area. FIG. 6 depicts one or more servers 108 providing the event message 102 to a first user device 110(1) associated with a first user 104(1) and a second user device 110(2) associated with a second user 104(2).

At 604, a communication requesting assistance is received from the first user device 110(1). A user interaction module 130 associated with the server(s) 108 may receive a user communication 112 from the first user device 110(1) via a user interface, such as an application executing on one or more of the first user device 110(1) or the server(s) 108. In some implementations, the user communication 112 may include one or more messages generated by the user 104(1). In other implementations, the user communication 112 may be generated by one or more user interactions with the first user device 110(1). For example, by interacting with a map interface, selecting a button, selecting an item from a list, and so forth, the user 104(1) may cause a user communication 112 to be provided to the server(s) 108. FIG. 6 depicts the user communication 112 including a message indicating that the first user 104(1) is unable to walk and requires assistance.

At 606, a prompt 416 regarding an offer to assist the first user 104(1) may be provided to a second user device 110(2). One or more prompts 416 may be provided to a single user 104 or multiple users 104 within an area affected by an emergency condition 202 or other event. In some implementations, a prompt 416 may be provided to a single user 104, and if the single user 104 declines to assist the first user 104(1) or fails to respond to the prompt 416 within a threshold length of time, the prompt 416 may be provided to a subsequent user 104. In other implementations, the prompt 416 may be provided to multiple users 104 simultaneously. The user(s) 104 to which the prompt 416 is provided may be determined based on one or more of location data 216 or user data 120 associated with the users 104. For example, location data 216 associated with one or more users 104 may be used to determine the users 104 that are closest to a current location of the first user 104(1). One or more users 104 may be provided with the prompt 416 based on the distance of those users 104 from the first user 104(1). In other implementations, the users 104 provided with the prompt 416 may be determined based on user data 120. For example, depending on the nature of an event, child-aged users 104, elderly users 104, or disabled users 104 may not be provided with a prompt 416 requesting assistance for other users 104.

When the second user 104(2) responds affirmatively to the prompt 416, indicating a willingness to assist the first user 104(1), at 608, a chat interface 610 may be provided to the first user device 110(1) and the second user device 110(2). FIG. 6 depicts the chat interface 610 being used to communicate the current location of the first user 104(1) to the second user 104(2). In some implementations, the chat interface 610 may be used to provide communications directly from the first user device 110(1) to the second user device 110(2) and from the second user device 110(2) to the first user device 110(1).

For example, one or more of the first user device 110(1) or the second user device 110(2) may be provided with a prompt 416 regarding willingness to directly communicate with or share contact information with other users 104. If one or both users 104 respond affirmatively to the prompt 416, the chat interface 610 or another medium of communication, such as SMS, Bluetooth, Near Field Communication (NFC), voice communications or other communications via a cellular network, and so forth, may be accessed by the user devices 110 independent of the server(s) 108. For example, the user devices 110 may communicate using methods other than the chat interface 610, such as SMS, e-mail, voice communications, and so forth. If one or more means of communication are unusable, such as due to an emergency condition 202, multiple user devices 110 may be used to establish an ad hoc network using peer-to-peer or other types of connections. For example, in the absence of communication with the server(s) 108, one or more of the functions performed by the server(s) 108 may be performed by one or more of the user devices 110.

In other implementations, the chat interface 610 may be used to provide communications to the server(s) 108. The server(s) 108 or an individual associated with the system 100 may provide the received communications to one or more other user devices 110. In some implementations, the server(s) 108 or the individual associated with the system 100 may filter, moderate, or curate one or more of the communications. In other implementations, one or more individuals associated with the system 100 may provide communications to the chat interface 610. The communications provided using the chat interface 610 may include text, image data, audio data, video data, icons, and so forth.

At 612, communications between the first user device 110(1) and the second user device 110(2) may be curated by an individual associated with the system 100. FIG. 6 depicts the chat interface 610 being used to communicate that the second user 104(2) has encountered difficulty navigating to the location of the first user 104(1). An individual associated with the server(s) 108 may use the chat interface 610 to provide assistance to the second user 104(2) regarding navigation. For example, the first user 104(1) may be unaware of the specific location of one or more of the first user 104(1) or the second user 104(2). However, the server(s) 108 may determine location data 216 from the first user device 110(1) and the second user device 110(2). Communications provided by the server(s) 108 using the chat interface 610 may therefore be based on sensor data 114 determined from one or more user devices 110.

Figure 7:
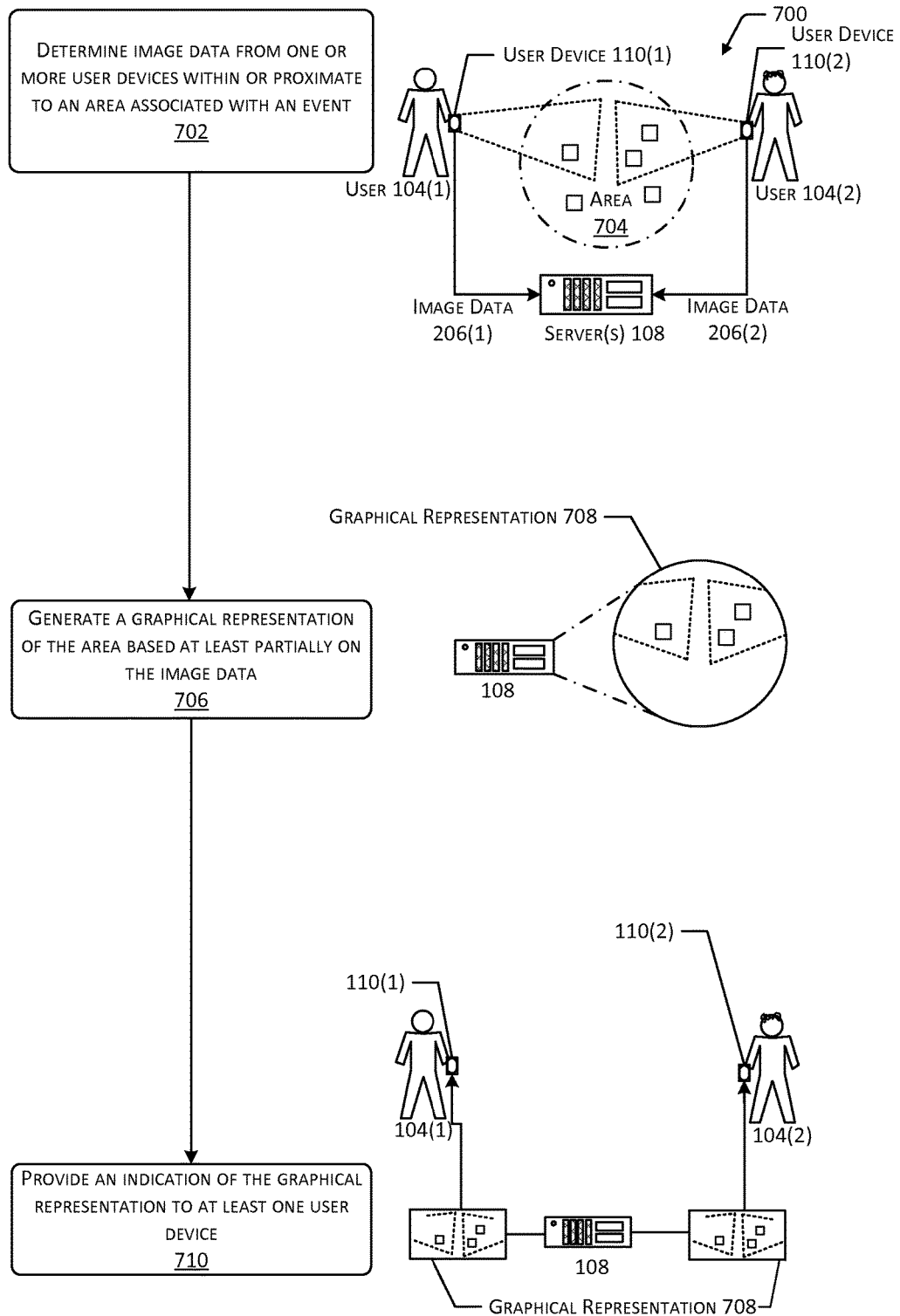
FIG. 7 illustrates a method for generating a graphical representation of an area using image data determined from one or more user devices and providing an indication of the graphical representation to the user devices.

FIG. 7 illustrates a method 700 for generating a graphical representation of an area using image data 206 determined from user devices 110 and providing an indication of the graphical representation to user devices 110. As described previously, sensor data 114 may be determined from one or more user devices 110. Sensor data 114 may include one or more of image data 206, audio data 208, motion data 210, temperature data 212, biometric data 214, or location data 216. The sensor data 114 may be determined using one or more sensors associated with a user device 110. In some implementations, the sensor data 114 may include video data, such as a streaming video associated with an area. For example, one or more user devices 110 may generate video data corresponding to an event associated with an area. The video data may be provided to the server(s) 108, and by the server(s) 108 to other user devices 110, in real time or substantially in real time.

At 702, image data 206 from one or more user devices 110 within or proximate to an area 704 associated with an event may be determined. For example, a camera or other image sensor associated with a first user device 110(1) may be used to acquire image data 206(1) representative of a first portion of the area 704. A camera or other image sensor associated with a second user device 110(2) may be used to acquire image data 206(2) representative of a second portion of the area 704. The image data 206 may be provided to one or more server(s) 108. FIG. 7 depicts the server(s) 108 determining image data 206 from two user devices 110. However, image data 206 or other types of sensor data 114 may be determined from any number of user devices 110. For example, audio data 208, motion data 210, location data 216, and so forth, may be determined, in addition to or in place of image data 206.

At 706, a graphical representation 708 of the area 704 may be generated, based at least partially on the image data 206. For example, one or more modules associated with the server(s) 108 may process the image data 206 to generate one or more images representative of portions of the area 704 associated with the user devices 110. The image data 206 from one or multiple user devices 110 may be used to generate the graphical representation 708. The graphic representation 708 may include one or more of an image of all or a portion of the area 704, a three-dimensional (3D) representation of the area 704, or a diagrammatic representation of the area 704. For example, FIG. 7 depicts a graphical representation 708 that includes portions of the area 704 associated with the first user device 110(1) and the second user device 110(2). In other implementations, the graphical representation 708 may be determined using audio data 208, motion data 210, and so forth. For example, the graphical representation 708 may include indications of types of sound, volumes of sound, quantities of movement, rates of movement, and so forth, in one or more portions of the area 704.

At 710, an indication of the graphical representation 708 may be provided to at least one user device 110. In some implementations, the server(s) 108 may provide the graphical representation 708 to one or more user devices 110. In other implementations, the server(s) 108 may provide a simplified diagram representative of the graphical representation 708, a map interface based on the graphical representation 708, a textual description of the graphical representation 708, a link that may be selected by a user 104 to access the graphical representation 708, and so forth.

Figure 8:
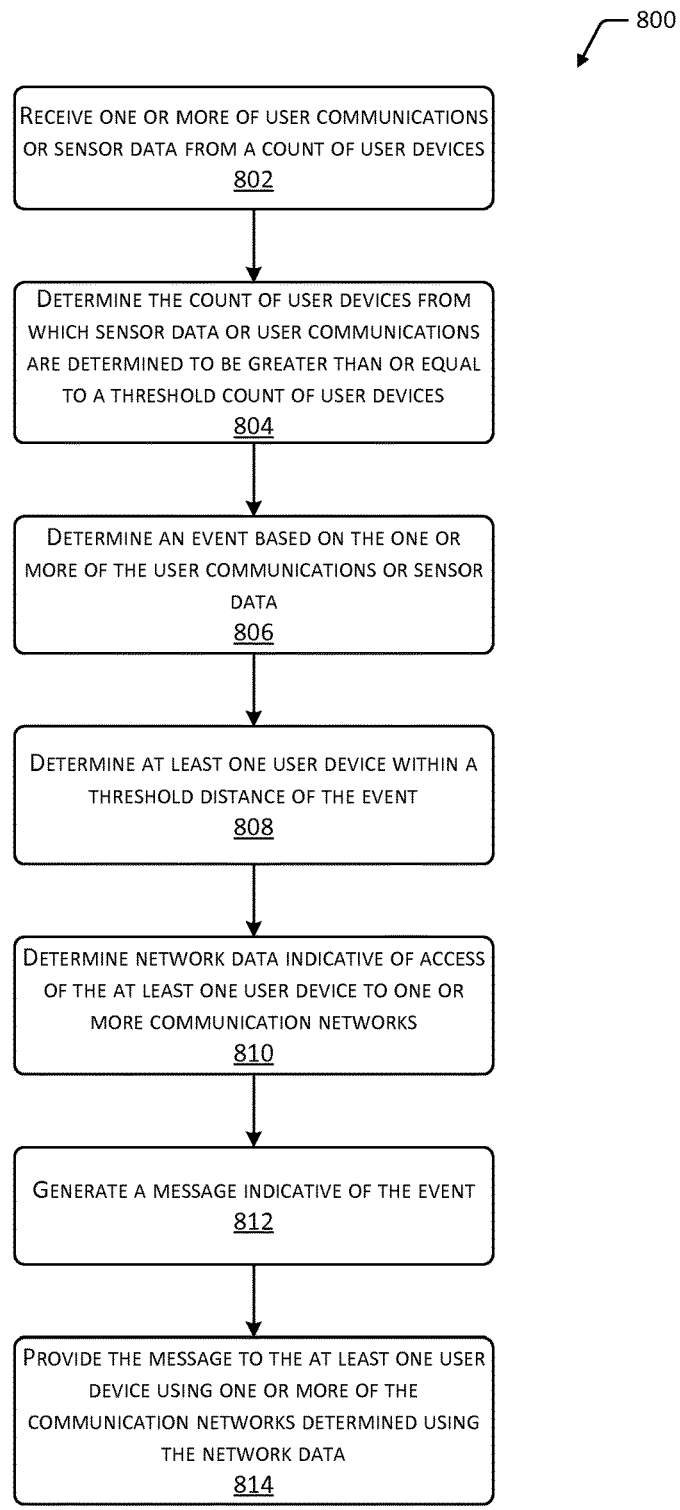
FIG. 8 is a flow diagram illustrating a method for determining emergency conditions from user communications or sensor data and providing messages based on network data determined from user devices.

FIG. 8 is a flow diagram 800 illustrating a method for determining events from user communications 112 or sensor data 114 and providing event messages 102 based on user network data 246 determined from user devices 110.

Block 802 receives one or more of user communications 112 or sensor data 114 from a count of user devices 110. User communications 112 may include an indication of an event associated with an area proximate to the user device 110. For example, a user device 110 may provide a message, one or more images, audio data, and so forth. Sensor data 114 may include one or more of image data 206, audio data 208, motion data 210, temperature data 212, biometric data 214, or location data 216.

Block 804 determines the count of user devices 110 providing the user communications 112 or sensor data 114 to be greater than or equal to a threshold count 222 of user devices 110. If user communications 112 or sensor data 114 are received from a count of user devices 110 less than the threshold count 222, the user communications 112 or sensor data 114 may be disregarded until additional user communications 112 or sensor data 114 are received. In some implementations, if the user communications 112 or sensor data 114 are received from a count of user devices 110 less than the threshold count 222, the system 100 may determine additional user devices 110 within or proximate to an area 704 associated with an event. Additional sensor data 114 may be determined from the additional user devices 110. In other implementations, a prompt 416 or a similar request for a user interaction may be provided to one or more user devices 110 within or proximate to the area 704. The prompt 416 may be used to confirm the presence or absence of an event. For example, if a count of user communications 112 less than the threshold count 222 is received, additional users 104 within or proximate to the area 704 may be provided with prompts 416 requesting that the users 104 verify the presence or absence of an event.

Block 806 determines an event based on the one or more of the sensor data 114 or user communications 112. An event determination module 106 may determine correspondence between one or more of sensor data 114 or a count of user communications 112 and event data 116. Event data 116 may include threshold counts 222 of user communications 112 and threshold counts 222 of user devices 110 from which sensor data 114 indicative of an event may be determined. Event data 116 may also include threshold values for one or more types of sensor data 114 and threshold variances 224 associated with one or more of the threshold values. For example, a threshold variance 224 may include a quantity by which a received sensor data 114 value may differ from a threshold value to indicate an event. In other implementations, a threshold variance 224 may include a quantity that a received sensor data 114 value may equal, exceed, or fall below to indicate an event. Based at least partially on one or more of the user communications 112, the sensor data 114, or the event data 116, the presence or absence of the event may be determined.

Block 808 determines at least one user device 110 within a threshold distance of the event. Location data 216 from one or more user devices 110 may be received and used to determine a current location of the user device(s) 110. User devices 110 within an area 704 affected by an event and user devices 110 within a threshold distance of the area 704 may be identified. The threshold distance may be preselected by a user 104 or one or more threshold distances that correspond to one or more types of events may be stored in association with one or more servers 108. For example, the threshold distance may vary depending on the nature of an event. Continuing the example, an event that is localized within a single structure, such as a fire, may have a threshold distance of zero or a small threshold distance, such as ten feet. An event that may affect traffic or communication services within a larger area 704, such as a music or sporting event, may have a threshold distance of several hundred yards. An event that may affect a widespread area 704, such as a hurricane, may have a threshold distance of fifty miles or more.

Block 810 determines user network data 246 indicative of access of the at least one user device 110 to one or more communication networks. Each user device 110 may be configured to use one or more networks or channels of communication, such as SMS, e-mail, cellular networks, wireless networks, and so forth. The specific networks or channels of communication accessible to a user device 110 may be determined by the hardware or software associated with the user device 110. In some implementations, access to one or more networks or channels of communication may be affected by a network outage or by an event. The user network data 246 may be used to determine multiple methods of communicating with one or more user devices 110 in the event that one or more channels of communication are not usable. For example, an emergency condition 202 may prevent access to a WAN by one or more user devices 110, such that e-mail is not able to be used to provide event messages 102 to user devices 110 within the area 704. The user network data 246 may indicate that one or more user devices 110 are able to access a cellular network. Subsequent event messages 102 may be provided using SMS, audio signals, or other types of signals that may be provided over a cellular network. In other implementations, event messages 102 may be provided using social media sites. In still other implementations, if a user device 110 is unable to access a network, event messages 102 may be provided between user devices 110. For example, an event message 102 may be relayed between user devices 110 within an area 704 using peer-to-peer communication.

In some implementations, responsive to a determination that one or more networks or other channels of communication are impaired or unusable, an uncrewed autonomous vehicle (UAV) may be provided to an area associated with an event. The UAV may include transceivers or other equipment that may be used to enable communications to and from user devices 110 within the area 704. In other implementations, one or more UAVs may be transported or dispatched to an area 704 responsive to an event message 102 or to sensor data 114 or user communications 112 indicative of an event impacting the area 704. A plurality of UAVs may communicate with one another. The communications between UAVs may comprise a mesh network in which each UAV that participates may send, receive, or relay data such that data is distributed to designated recipient(s). In other implementations, other network topologies may be used, such as ring networks, star networks, tree networks, and so forth.

Block 812 generates one or more event messages 102 indicative of the event. As described previously, event messages 102 may include information regarding a determined event and content determined at least partially using the user network data 246 or user data 120 associated with one or more user devices 110. For example, an event message 102 may include a format specific to a particular network or channel of communication. Continuing the example, an event message 102 provided as an audio signal over a cellular network may not include image data, while an event message 102 provided using SMS may not include video data. As another example, an event message 102 may include content specific to user data 120 associated with a particular user device 110. Continuing the example, an event message 102 provided to a child-aged user 104 may not include images or language unsuitable for minors. An event message 102 provided to a colorblind user 104 may include a black and white map interface in place of a colored map interface. An event message 102 may include text, audio data, image data, video data, and so forth. In some implementations, an event message 102 may include an audible or visible alert or notification in place of or in addition to alphanumeric data, image data, or audio data indicative of an event.

Block 814 provides the event message 102 to the at least one user device 110 using one or more of the communication networks determined using the user network data 246. In some implementations, a single event message 102 may be provided to multiple user devices 110. In other implementations, one or more event messages 102 may be customized based on the particular user device 110 receiving the event message 102. For example, each user device 110 may have user network data 246 or user data 120 specific to that user device 110. The event message 102 provided to that user device 110 may include content based at least partially on the user network data 246 or other user data 120 associated with the user device 110.

Figure 9:
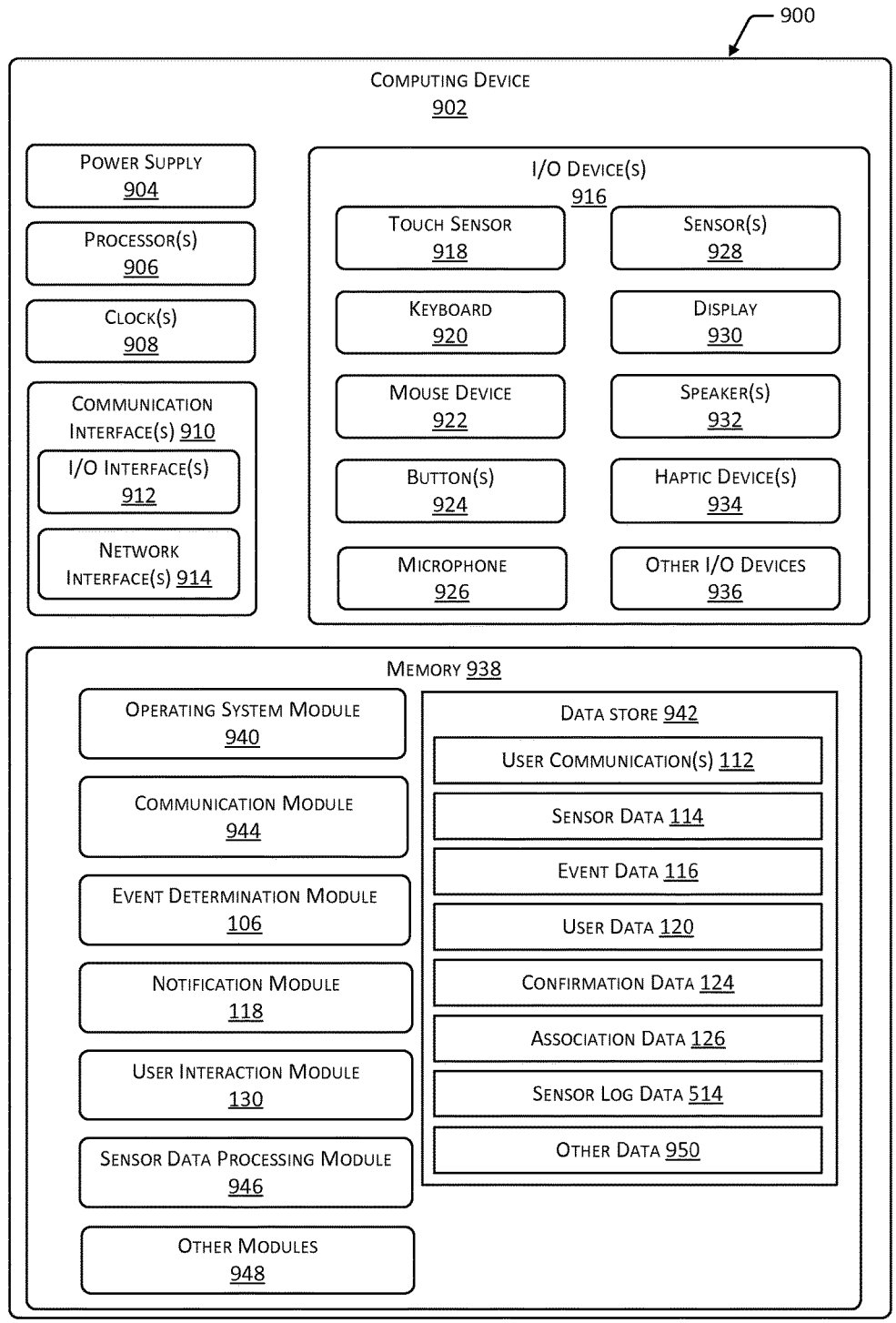
FIG. 9 is a block diagram illustrating a computing device within the scope of the present disclosure.

FIG. 9 is a block diagram 900 of a computing device 902 configured to support operation of the system 100. The computing device 902 may include one or more user devices 110, one or more servers 108, or one or more other computing devices 902 in communication with the user device(s) 110 or server(s) 108. The computing device 902 may also include one or more computer-readable storage media (CRSM) accessible to any of the computing devices 902.

One or more power supplies 904 may be configured to provide electrical power suitable for operating the components of the computing device 902. In some implementations, the power supply 904 may include a rechargeable battery, fuel cell, photovoltaic cell, power conditioning circuitry, and so forth.

The computing device 902 may include one or more hardware processor(s) 906 (processors) configured to execute one or more stored instructions. The processor(s) 906 may include one or more cores. One or more clocks 908 may provide information indicative of date, time, ticks, and so forth. For example, the processor(s) 906 may use data from the clock 908 to generate a timestamp, trigger a preprogrammed action, and so forth.

The computing device 902 may include one or more communication interfaces 910, such as input/output (I/O) interfaces 912, network interfaces 914, and so forth. The communication interfaces 910 may enable the computing device 902, or components of the computing device 902, to communicate with other computing devices 902 or components of the other computing devices 902. The I/O interfaces 912 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 912 may couple to one or more I/O devices 916. The I/O devices 916 may include any manner of input device or output device associated with a user device 110, a server 108, or another computing device 902 in communication with a user device 110 or a server 108. For example, I/O devices 916 may include input devices such as a touch sensor 918, a keyboard 920, a mouse device 922, one or more buttons 924, a microphone 926, and so forth. Input devices may also include one or more sensors 928, such as image sensors (e.g., cameras), motion sensors, temperature sensors, biometric sensors, or location sensors. Sensors 928 may be used to determine sensor data 114. I/O devices 916 may include output devices such as a display 930, one or more speakers 932, one or more haptic devices 934, and so forth. Other I/O devices 936 may also be included, such as scanners, printers, and so forth. In some implementations, the I/O devices 916 may be physically incorporated with the computing device 902 or may be externally placed.

The network interfaces 914 may be configured to provide communications between the computing device 902 and other devices, such as the I/O devices 916, routers, access points, and so forth. The network interfaces 914 may include devices configured to couple to one or more networks including LANs, wireless LANs, WANs, wireless WANs, and so forth. For example, the network interfaces 914 may include devices compatible with Ethernet, Wi-Fi, Bluetooth, ZigBee, Z-Wave, 3G, 4G, LTE, and so forth.

The computing device 902 may include one or more busses or other internal communications hardware or software that allows for the transfer of data between the various modules and components of the computing device 902.

As shown in FIG. 9, the computing device 902 may include one or more memories 938. The memory 938 may include one or more CRSM. The CRSM may be any one or more of an electronic storage medium, a magnetic storage medium, an optical storage medium, a quantum storage medium, a mechanical computer storage medium, and so forth. The memory 938 may provide storage of computer-readable instructions, data structures, program modules, and other data for the operation of the computing device 902. A few example modules are shown stored in the memory 938, although the same functionality may alternatively be implemented in hardware, firmware, or as a system on a chip (SoC).

The memory 938 may include one or more operating system (OS) modules 940. The OS module 940 may be configured to manage hardware resource devices such as the I/O interfaces 912, the network interfaces 914, the I/O devices 916, and to provide various services to applications or modules executing on the processors 906. The OS module 940 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 942 and one or more of the following modules may also be stored in the memory 938. The modules may be executed as foreground applications, background tasks, daemons, and so forth. The data store 942 may use a flat file, database, linked list, tree, executable code, script, or other data structure to store information. In some implementations, the data store 942 or a portion of the data store 942 may be distributed across one or more other devices including other computing devices 902, network attached storage devices, and so forth.

A communication module 944 may be configured to establish communications with one or more other computing devices 902, such as user devices 110, servers 108, storage media, or other computing devices 902 in communication therewith. The communications may be authenticated, encrypted, and so forth. For example, communications, such as event messages 102 and user communications 112, between user devices 110 and servers 108 as well as between multiple user devices 110 may be authenticated prior to processing of the communications by a receiving device using digital certificates, challenge questions/responses, or other techniques.

The memory 938 may store the event determination module 106. The event determination module 106 may receive one or more of user communications 112 or sensor data 114 from one or more user devices 110. In some implementations, the event determination module 106 may receive communications or data from other computing devices 902 associated with one or more areas 704 or emergency conditions 202. For example, one or more sensors 928, independent of a user device 110, may be used to determine sensor data 114 from one or more areas 704. In other implementations, the event determination module 106 may receive sensor log data 514 from one or more user devices 110. Sensor log data 514 may include sensor data 114 obtained by the user device 110 for a length of time prior to determination of an event.

The event determination module 106 may determine sensor data 114 from the sensors 928 and correspondence between the sensor data 114 and event data 116. Correspondence or lack of correspondence between the sensor data 114 and event data 116 may be used to determine the presence or absence of an event. When user communications 112 or sensor data 114 are insufficient to determine the presence or absence of an event, additional sensor data 114 may be determined. In some implementations, a prompt 416 or another type of request for a user interaction may be provided to one or more user devices 110 to verify the presence or absence of the event through additional user communications 112. For example, an additional user communication 112 may include a response to the prompt 416.

The memory 938 may also include the notification module 118. When the presence of an event is determined, the notification module 118 may determine one or more user devices 110 within a threshold distance of an area 704 associated with the event. For example, the notification module 118 may determine user data 120 associated with one or more user devices 110. The user data 120 may include location data 216 corresponding to a current location of the user device(s) 110. The notification module 118 may determine the distance between one or more user devices 110 and the area 704 associated with the event using the location data 216. The notification module 118 may also generate event messages 102 to be provided to the user devices 110 within the threshold distance of the area 704. In some implementations, an event message 102 may be based at least partially on user data 120 associated with the user device 110 receiving the event message 102. For example, an event message 102 may include a route from the current location of a user device 110, determined using location data 216, to a safe location. As another example, user data 120 may include a user age 242 or user medical data 244. The content or format of an event message 102 may be determined at least partially using the user data 120. Continuing the example, an event message 102 provided to a blind user 104 may include audio content in place of text or image data, while an event message 102 provided to a deaf user 104 may include text or image data in place of audio data. User data 120 may also include user network data 246, which may include characteristics of the user device 110, such as the capability for the user device 110 to access one or more types of networks. User network data 246 may also include telephone numbers or e-mail addresses associated with the user 104, contact information for contacting the user 104 using a social media site, and so forth. An event message 102 may include content based on the user network data 246. For example, an event message 102 may include one or more formats or types of data suitable for use with a particular network, while excluding formats or types of data that may not be provided using the particular network.

As described previously, the user data 120 may include verification data 122, which may be used to ensure that a user 104 receives event messages 102 solely from message providers selected by the user 104. The notification module 118 may determine and provide verification data 122 specific to a user 104 or user device 110 prior to or concurrent with an event message 102. The verification data 122 may be configured to cause a user device 110 to begin processing the event message 102, such as by displaying the event message 102, providing a visible or audible alert, and so forth. In some implementations, the verification data 122 may be configured to cause the user device 110 to modify one or more configurations, such as a volume, illumination, or vibration setting. In other implementations, the verification data 122 may be configured to cause the user device 110 to provide sensor log data 514 to one or more other computing devices 902.

The notification module 118 may also generate notifications 128 to be provided to users 104 determined from association data 126 associated with a particular user 104. Responsive to one or more of generation of an event message 102 to be provided to a user device 110, providing of the event message 102 to the user device 110, receipt of confirmation data 124 from the user device 110, or receipt of a user communication 112 from the user device 110, a notification 128 may be generated and provided to one or more additional users 104. Association data 126 may include user identifiers 406 and user contact information 408 of additional users 104 associated with a particular user 104, such as friends or family members of the particular user 104. In some implementations, association data 126 may include user data 120 associated with one or more of the additional users 104. For example, a notification 128 provided to a user device 110 of a friend or family member of a user 104 that receives an event message 102 may include content determined based on user data 120 of the friend or family member. Continuing the example, a friend or family member of the user 104 may be incapable of using certain networks or channels of communication. As another example, a friend or family member of the user 104 may have a medical condition that limits the access of the friend or family member to certain types of notifications 128.

The memory 938 may further include the user interaction module 130. The user interaction module 130 may be used to communicate with one or more users 104 during an event. For example, the user interaction module 130 may receive additional user communications 112, sensor data 114, or other types of messages or data responsive to an event message 102 provided to a user device 110. The user interaction module 130 may provide a user interface to the user device 110 that may be used to provide communications to other computing devices 902. The user interaction module 130 may also be used to provide prompts 416 to one or more user devices 110 and to receive responses to the prompts 416. The user interaction module 130 may further be used to provide a chat interface 610 to one or more user devices 110 and to receive user communications for display using the chat interface 610.

The memory 938 may include a sensor data processing module 946. The sensor data processing module 946 may receive and process sensor data 114 and sensor log data 514. For example, the sensor data processing module 946 may include image processing software, audio processing software, software for processing biometric data 214, temperature data 212, or motion data 210, other types of data processing software, and so forth. In some implementations, the sensor data processing module 946 may be used to convert sensor data 114 determined from one or more sensors 928 to a format that may be used by one or more modules of the computing device 902.

Other modules 948 may also be present in the memory 938. For example, encryption modules may be used to encrypt and decrypt communications between computing devices 902. Authentication modules may be used to authenticate communications sent or received by computing devices 902. The authentication modules may be used to authenticate one or more event messages 102 or user communications 112, one or more sending or receiving devices (e.g., user devices 110 or servers 108), users 104 of computing devices 902, communication sessions between computing devices 902, and so forth. Network determination modules may determine available networks or channels of communication by which event messages 102 and notifications 128 may be provided. Graphic rendering modules may generate graphical representations 708 of areas 704 associated with emergency conditions 202.

Other data 950 may include user input data, such as configurations and settings associated with user devices 110, threshold values stored as event data 116, libraries and other resources for performing data processing, keys and other data that may be used as verification data 122, and so forth. Other data 950 may also include authentication credentials, certificates, and so forth. The authentication credentials, certificate, or similar authentication data may be used to authenticate one or more of computing devices 902, users 104, communication sessions, or the communications sent or received by computing devices 902.

In different implementations, different computing devices 902 may have different capabilities or capacities. For example, server(s) 108 may have significantly more processor 906 capability and memory 938 capacity compared to the processor 906 capability and memory 938 capacity of user devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors configured to execute the computer-executable instructions to:
   determine an emergency condition associated with an area;
   determine a first user device within a threshold distance of the area;
   determine user data associated with the first user device, wherein the user data indicates one or more characteristics of one or more of the first user device or a user associated with the first user device;
   generate a message including an indication of the emergency condition for providing to the first user device, wherein the message includes one or more instructions based on the one or more characteristics;
   access verification data associated with the first user device, wherein the verification data is configured to cause the first user device to receive, process, or both receive and process the message;
   provide the verification data to the first user device;
   provide the message to the first user device;
   determine a lapse of a threshold length of time prior to receipt of confirmation data from the first user device;
   in response to the lapse of the threshold length of time, modify at least one configuration of the first user device to form a modified configuration;
   provide one or more of the message or a second message to the first user device, wherein the one or more of the message or the second message comprises a portion corresponding to the modified configuration;
   receive the confirmation data indicative of receipt of the message from the first user device;
   receive a communication regarding the emergency condition from one of the first user device or a second user device; and
   provide data indicative of the communication to the other of the first user device or the second user device.

2. The system of claim 1, wherein the computer-executable instructions to modify the at least one configuration include computer-executable instructions to configure the first user device to emit one or more of sound, light, or vibration, and the portion corresponding to the modified configuration is configured to cause the first user device to emit the one or more of the sound, the light, or the vibration.

3. The system of claim 1, further comprising computer-executable instructions to: in response to the lapse of the threshold length of time, actuate one or more sensors of the first user device to determine sensor data indicative of a status of the user associated with the first user device.

4. A method comprising:
   receiving a communication indicative of an event associated with a count of user devices;
   determining the count of user devices to exceed a threshold count of user devices;
   determining a first user device within a threshold distance of an area associated with the event;
   determining user data associated with the first user device, wherein the user data indicates one or more characteristics of one or more of the first user device or a user associated with the first user device;
   generating a message including an indication of the event and one or more instructions based on the user data;
   providing the message to the first user device;
   determining a lapse of a threshold length of time prior to receipt of a confirmation from the first user device; and
   in response to the lapse of the threshold length of time, accessing sensor data associated with the first user device to determine one or more of a status of the user or a status of an area proximate to the first user device.

5. The method of claim 4, further comprising:
   accessing verification data associated with the first user device;
   providing the verification data to the first user device prior to providing the message to at least one user device,
   wherein the verification data is configured to cause modification of at least one configuration of the first user device.

6. The method of claim 4, wherein the message comprises a prompt requesting the confirmation, the method further comprising:
   receiving the confirmation indicative of receipt of the message from the first user device;
   accessing association data corresponding to the first user device, wherein the association data includes contact information of at least one associated user; and
   providing an identifier associated with the first user device and an indication of the confirmation to at least one device associated with the contact information of the at least one associated user.

7. The method of claim 4, wherein receiving the communication indicative of the event comprises:
   receiving a communication indicative of one or more of:
   a loss of accessibility to one or more networks by one or more user devices within the area associated with the event;
   an impediment to travel within at least a portion of the area associated with the event; or
   a loss of one or more services within the area associated with the event.

8. The method of claim 4, further comprising verifying the communication indicative of the event by:
   determining a variance between the sensor data and one or more threshold sensor values, wherein the variance exceeds a threshold variance;
   wherein the message is generated responsive to the variance.

9. The method of claim 4, further comprising:
receiving a communication from one of the first user device or a second user device within the threshold distance of the area associated with the event;
determining content of the communication corresponding to the event; and
providing at least a portion of the content to the other of the first user device or the second user device.

10. The method of claim 4, wherein the user data is indicative of one or more restrictions regarding routes, the method further comprising:
determining location data associated with the first user device;
wherein the message includes one or more of a route or a map from a first location to a second location based at least partially on the user data and the location data.

11. The method of claim 4, further comprising:
in response to the lapse of the threshold length of time, modifying at least one configuration of the first user device to configure the first user device to emit one or more of sound, light, or vibration; and
providing one or more of the message or a second message to the first user device, wherein the one or more of the message or the second message comprises a portion corresponding to the modification of the at least one configuration and the portion causes the first user device to emit the one or more of the sound, the light, or the vibration.

12. The method of claim 4, further comprising:
in response to the lapse of the threshold length of time, determining a second user device within a threshold distance of the first user device; and
providing a second message to the second user device, wherein the second message is indicative of one or more of a location or a status associated with the first user device.

13. A system comprising:
one or more memories storing computer-executable instructions; and
one or more hardware processors configured to execute the computer-executable instructions to:
receive sensor data from a plurality of user devices associated with an area;
determine an emergency condition associated with the area based at least partially on the sensor data;
determine user data associated with a first user device of the plurality of user devices, wherein the user data is indicative of one or more characteristics of one or more of the first user device or a user associated with the first user device;
generate a message indicative of the emergency condition, wherein the message includes one or more instructions based on the user data;
provide the message to the first user device;
determine a lapse of a threshold length of time prior to receipt of a confirmation from the first user device;
in response to the lapse of the threshold length of time, modify at least one configuration of the first user device to form a modified configuration; and
provide one or more of the message or a second message to the first user device, wherein the one or more of the message or the second message comprises a portion corresponding to the modified configuration.

14. The system of claim 13, wherein the sensor data comprises image data, the system further comprising computer-executable instructions to:
generate a graphical representation of one or more of the area or the emergency condition using the image data; and
provide one or more of the graphical representation or an indication of the graphical representation to at least one user device of the plurality of user devices.

15. The system of claim 13, further comprising computer-executable instructions to:
provide verification data to at least one user device of the plurality of user devices, wherein the verification data is configured to cause the at least one user device to provide sensor log data to the system; and
receive the sensor log data from the at least one user device, wherein the sensor log data corresponds to a length of time prior to determination of the emergency condition.

16. The system of claim 13, further comprising computer-executable instructions to:
generate a prompt indicative of the emergency condition based at least partially on the sensor data;
provide the prompt to one or more user devices of the plurality of user devices; and
receive response data from the one or more user devices;
wherein the determination of the emergency condition is further based at least partially on the response data.

17. The system of claim 13, further comprising computer-executable instructions to:
determine location data associated with the first user device and a second user device of the plurality of user devices;
wherein the message provided to the first user device includes a route associated with a location corresponding to the second user device.

18. The system of claim 13, further comprising computer-executable instructions to:
determine network data associated with at least a portion of the plurality of user devices, wherein the network data is indicative of access of the at least a portion of the plurality of user devices to one or more communication networks; and
determine at least a portion of the one or more communication networks accessible to the first user device;
wherein the message includes a format corresponding to the at least a portion of the one or more communication networks.

19. The system of claim 13, further comprising computer-executable instructions to:
receive a communication from the first user device; and
provide a chat interface to the first user device, wherein the chat interface is configured to receive and display communications from the first user device and at least a second user device of the plurality of user devices.

20. The system of claim 13, further comprising computer-executable instructions to:
in response to the lapse of the threshold length of time, access sensor data associated with the first user device to determine one or more of a status of the user or a status of an area proximate to the first user device responsive to the lapse of the threshold length of time.

* * * * *